US011619463B2

(12) United States Patent
Peters et al.

(10) Patent No.: US 11,619,463 B2
(45) Date of Patent: Apr. 4, 2023

(54) AIRCRAFT GUN-BLAST DIFFUSERS, PLUGS FOR AIRCRAFT GUN-BLAST DIFFUSERS, AND METHODS OF MAKING SUCH PLUGS

(71) Applicant: The Boeing Company, Chicago, IL (US)

(72) Inventors: Garrett B. Peters, St. Louis, MO (US); Lucian Woods, Florissant, MO (US); Robert R. Johnson, Kirkwood, MO (US); Daniel E. Pulcher, St. Charles, MO (US); Anthony C. Roberts, St. Paul, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/485,791

(22) Filed: Sep. 27, 2021

(65) Prior Publication Data

US 2022/0325973 A1    Oct. 13, 2022

Related U.S. Application Data

(60) Provisional application No. 63/172,807, filed on Apr. 9, 2021.

(51) Int. Cl.
*F41A 23/20* (2006.01)
*B64D 7/02* (2006.01)
(Continued)

(52) U.S. Cl.
CPC .............. *F41A 21/38* (2013.01); *B64D 7/00* (2013.01); *B64D 7/02* (2013.01); *F41A 23/20* (2013.01)

(58) Field of Classification Search
CPC ... B64D 7/02; B64D 7/04; B64D 7/06; B64D 7/08; F41A 23/20; F41F 3/077;
(Continued)

(56) References Cited

U.S. PATENT DOCUMENTS 2,372,728 A * 4/1945 Martin ................ B64D 7/02
                                                89/33.14
2,445,235 A * 7/1948 Myers ................ F41A 27/10
                                                89/31

(Continued)

FOREIGN PATENT DOCUMENTS

CA          2253675      10/1964
CN        204040227      12/2014
(Continued)

OTHER PUBLICATIONS

Machine Translation of Jordan. <https://translationportal.epo.org/emtp/translate/?ACTION=description-retrieval&COUNTRY=FR&ENGINE=google&FORMAT=docdb&KIND=A1&LOCALE=en_EP&NUMBER=2875958&SRCLANG=fr&TRGLANG=en>. Mar. 2006. (Year: 2006).*

(Continued)

*Primary Examiner* — Gabriel J. Klein
(74) *Attorney, Agent, or Firm* — Walters & Wasylyna LLC

(57) ABSTRACT

A plug for insertion into a blast-tube exit cavity of a gun-blast diffuser comprises a plug front surface, a plug rear surface, a plug side surface that extends between the plug front surface and the plug rear surface, a body, comprising a polyurethane foam, and a substrate, coupled to the body and comprising a conductive nonwoven fabric, impregnated with a polyurethane matrix. The plug front surface of the plug is formed by the substrate. The plug rear surface of the plug is formed by the body. The plug side surface of the plug is formed by the substrate and the body.

20 Claims, 7 Drawing Sheets

(51) Int. Cl.
  *B64D 7/00* (2006.01)
  *F41A 21/38* (2006.01)

(58) Field of Classification Search
  CPC ......... B32B 33/00; B32B 5/022; B32B 5/245;
  B32B 27/065
  See application file for complete search history.

(56) References Cited

U.S. PATENT DOCUMENTS

| | | | | |
|---|---|---|---|---|
| 2,787,194 | A * | 4/1957 | Peterson | B64D 7/02 |
| | | | | 89/14.3 |
| 3,456,552 | A * | 7/1969 | Nash | F41F 3/065 |
| | | | | 89/31 |
| 3,670,622 | A * | 6/1972 | Bryant | F41A 21/32 |
| | | | | 89/36.01 |
| 3,838,425 | A * | 9/1974 | Ishimitsu | B64D 33/02 |
| | | | | 244/53 B |
| H319 | H | 8/1987 | Clayson | |
| 8,695,475 | B2 | 4/2014 | Schneider | |
| 2020/0247527 | A1* | 8/2020 | Waldrop, III | B64C 7/00 |

FOREIGN PATENT DOCUMENTS

| | | | | | |
|---|---|---|---|---|---|
| CN | 111002646 | A | * | 4/2020 | |
| FR | 2875958 | A1 | * | 3/2006 | ............ H01Q 17/00 |
| GB | 500856 | A | * | 2/1939 | |
| GB | 528528 | A | * | 10/1940 | |
| GB | 2133864 | A | * | 8/1984 | .............. B64D 1/06 |
| JP | H06218747 | A | * | 8/1994 | |
| JP | 4289721 | B2 | * | 7/2009 | |
| WO | WO-2004081311 | A2 | * | 9/2004 | ......... B29C 44/5618 |

OTHER PUBLICATIONS

Machine Translation of Huang. <https://worldwide.espacenet.com/patent/search/family/042155644/publication/CN101700706A?q=CN%20101700706%20A>. Apr. 2020. (Year: 2020).*
General Dynamics Ordnance and Tactical Systems, Aircraft Gun and Gun Systems, F/A-18 E/F 20 mm Gun Gatling System, https://www.gd-ots.com/armaments/aircraft-guns-gun-systems/f18-ef/.
Intellectual Property Office, Search Report, App. No. GB2204287.3 (dated Aug. 24, 2022).

* cited by examiner

AIRCRAFT GUN-BLAST DIFFUSERS, PLUGS FOR AIRCRAFT GUN-BLAST DIFFUSERS, AND METHODS OF MAKING SUCH PLUGS

PRIORITY

This application claims priority from U.S. Ser. No. 63/172,807 filed on Apr. 9, 2021.

TECHNICAL FIELD

Described herein are plugs for insertion within exit cavities of aircraft gun-blast diffusers and methods of making such plugs.

BACKGROUND

Many modern military aircraft are armed with powerful, high-performance guns. Such aircraft often utilize a diffuser that is attached to a muzzle of the gun. The diffuser directs and/or diffuses the high-pressure muzzle blast of an operating gun to prevent damage to aircraft structure and instruments. While conventional diffusers are effective in reducing the effects of aircraft gun blast, the physical configurations of the diffusers can impart considerable drag on the aircraft. Additionally, the physical configurations of the diffusers can pose a considerable radar cross-section risk due to their potential to reflect radar waves, which can make the aircraft more visible to radar.

SUMMARY

Accordingly, apparatuses and methods, intended to address at least the above-identified concerns, would find utility.

The following is a non-exhaustive list of examples of the subject matter, disclosed herein.

Disclosed herein is a plug for insertion into an exit cavity of a gun-blast diffuser. The plug comprises a front surface, a rear surface, a side surface that extends between the front surface and the rear surface, a body, comprising a polyurethane foam, and a substrate, coupled to the body and comprising a conductive nonwoven fabric, impregnated with a polyurethane matrix. The front surface of the plug is formed by the substrate. The rear surface of the plug is formed by the body. The side surface of the plug is formed by the substrate and the body.

The plug fills the exit cavity of the gun-blast diffuser to reduce a radar cross section of an aircraft and, more particularly, a radar cross section of the exit cavity of the gun-blast diffuser. Impregnating the conductive nonwoven fabric with the polyurethane matrix increases durability and handleability of the substrate. Conductivity of the conductive nonwoven fabric reflects radar waves to block detection of an internal geometry of the exit cavity. The polyurethane foam is frangible to facilitate destruction of the plug upon discharge of a projectile through the gun-blast diffuser.

Also disclosed herein is a gun-blast diffuser for an aircraft. The gun-blast diffuser comprises a blast tube, comprising an exit cavity. The gun-blast diffuser also comprises a plug, which comprises a front surface, a rear surface, a side surface that extends between the front surface and the rear surface, a body, comprising a polyurethane foam, and a substrate, coupled to the body and comprising a conductive nonwoven fabric, impregnated with a polyurethane matrix. At least a portion of the plug is located within the exit cavity. The front surface of the plug is defined by the substrate. The rear surface of the plug is defined by the body. The side surface of the plug is defined by the substrate and the body.

The gun-blast diffuser directs and/or diffuses muzzle blast of an aircraft-mounted gun. The blast tube and the exit cavity provide clearance and passage for the projectile through the gun-blast diffuser. The plug fills the exit cavity to reduce a radar cross section of an aircraft and, more particularly, a radar cross section of the exit cavity of the gun-blast diffuser. Impregnating the conductive nonwoven fabric with the polyurethane matrix increases durability and handleability of the substrate. Conductivity of the conductive nonwoven fabric reflects radar waves to block detection of an internal geometry of the exit cavity. The polyurethane foam is frangible to facilitate destruction of the plug upon discharge of the projectile through the blast tube.

Also disclosed herein is a method of making a plug for insertion into an exit cavity of a gun-blast diffuser. The plug comprises a front surface, a rear surface, and a side surface that extends between the front surface and the rear surface. The method comprising steps of: (1) impregnating a conductive nonwoven fabric with a polyurethane matrix to form a substrate; and (2) coupling the substrate to a body, comprising a polyurethane foam, so that: the front surface of the plug is formed by the substrate; the rear surface of the plug is formed by the body; and the side surface of the plug is formed by the substrate and the body.

Making the plug by impregnating the conductive nonwoven fabric with the polyurethane matrix increases durability and handleability of the substrate, prior to being coupled to the body. Use of the conductive nonwoven fabric facilitates reflecting radar waves to block detection of an internal geometry of the exit cavity. Use of the polyurethane foam facilitates destruction of the plug upon discharge of the projectile through the gun-blast diffuser.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
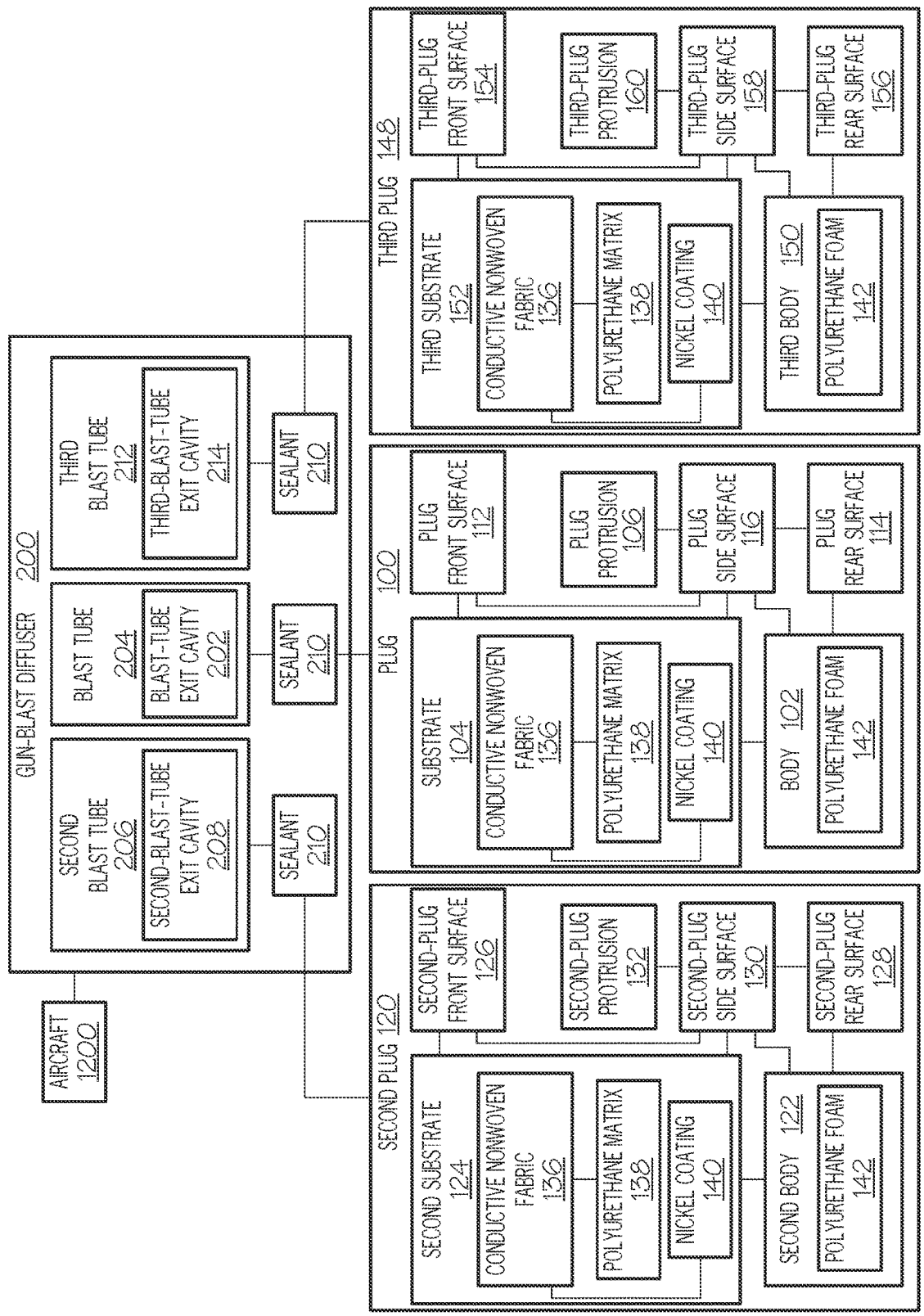
FIG. 1, is a block diagram of an aircraft gun-blast diffuser and a plug for the aircraft gun-blast diffuser, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting the blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 6:
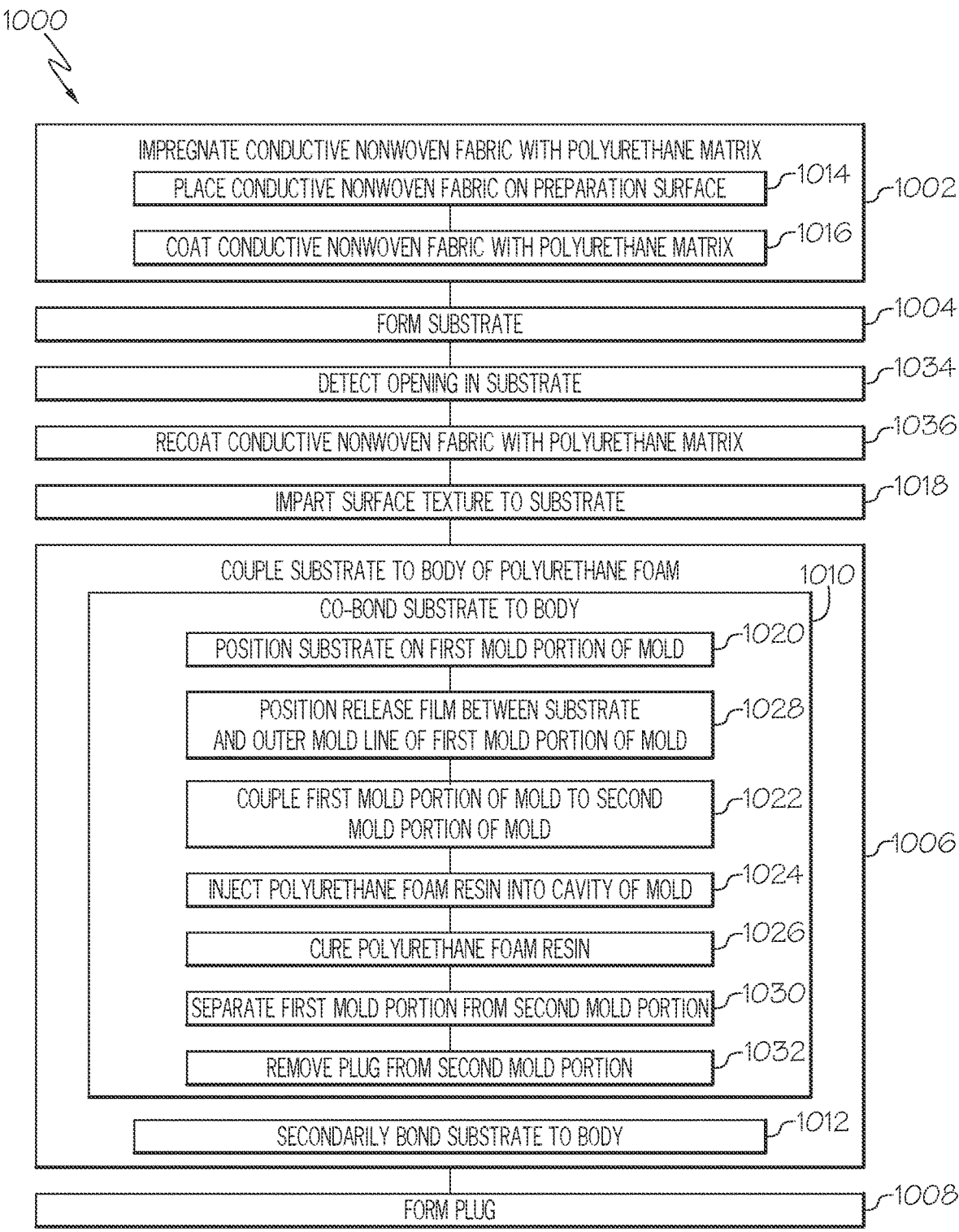
FIG. 6 is a block diagram of a method, according to one or more examples of the subject matter, disclosed herein, of making the plug for the gun-blast diffuser of FIG. 1, according to one or more examples of the subject matter, disclosed herein.

In FIG. 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. band the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Figure 2:
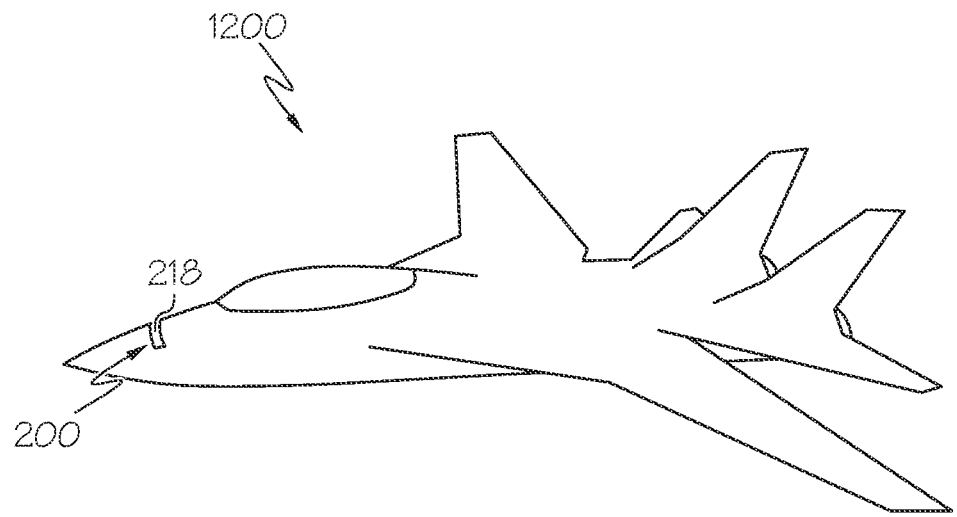
FIG. 2 is a schematic illustration of an aircraft, utilizing the aircraft gun-blast diffuser and the plug of FIG. 1, according to one or more examples of the subject matter, disclosed herein.
Figure 3:
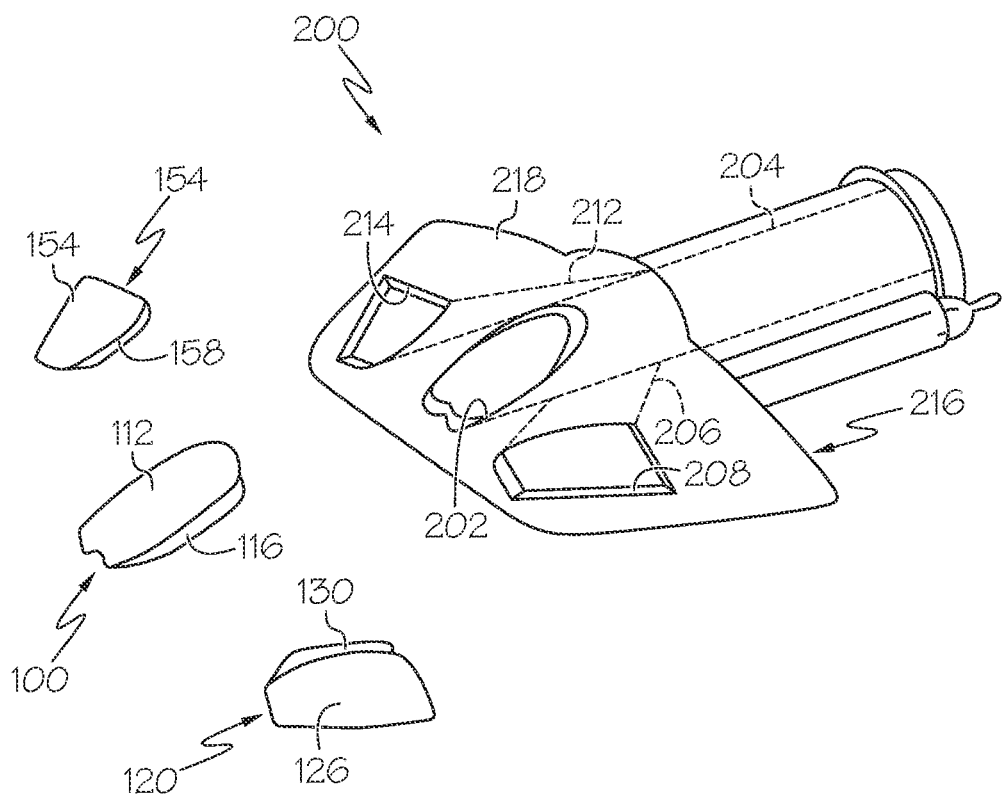
FIG. 3 is a schematic, perspective view of the aircraft gun-blast diffuser and the plug of FIG. 1, according to one or more examples of the subject matter, disclosed herein.
Figure 4:
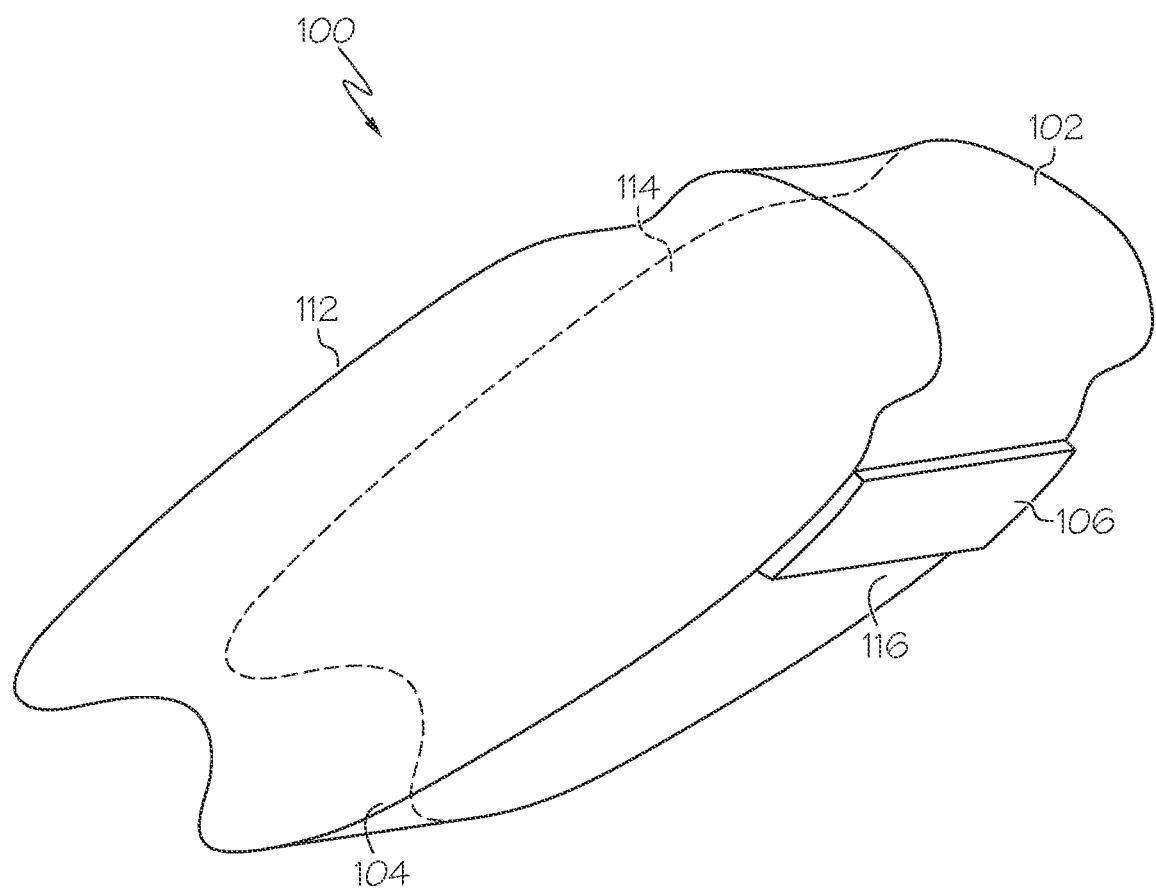
FIG. 4 is a schematic, perspective view of the plug of FIG. 1, according to one or more examples of the subject matter, disclosed herein.

Referring generally to FIG. 1 and particularly to, e.g., FIGS. 2-4 for illustrative purposes only and not by way of limitation, the following portion of this paragraph delineates example 1 of the subject matter, disclosed herein. According to example 1, plug 100 for insertion into blast-tube exit cavity 202 of gun-blast diffuser 200 is disclosed. Plug 100 comprises plug front surface 112, plug rear surface 114, and plug side surface 116 that extends between plug front surface 112 and plug rear surface 114. Plug 100 also comprises body 102, comprising polyurethane foam 142. Plug 100 additionally comprises substrate 104, coupled to body 102 and comprising conductive nonwoven fabric 136, impregnated with polyurethane matrix 138. Plug front surface 112 is formed by substrate 104. Plug rear surface 114 is formed by body 102. Plug side surface 116 is formed by substrate 104 and body 102.

Plug 100 fills blast-tube exit cavity 202 to reduce a radar cross section of gun-blast diffuser 200 of aircraft 1200. Impregnating conductive nonwoven fabric 136 with polyurethane matrix 138 increases durability and handleability of substrate 104. Conductivity of conductive nonwoven fabric 136 reflects radar waves to block detection of (e.g., an internal or peripheral) geometry of blast-tube exit cavity 202. Polyurethane foam 142 is frangible to facilitate destruction of plug 100 upon discharge of a projectile (e.g., bullet) through gun-blast diffuser 200.

It is recognized herein that cavities, ports, recesses, and other types of openings formed in a surface of an aircraft create an increased potential for reflection of radar waves and thus, increases a radar cross section of the aircraft. The radar cross section of an object refers to a measure of the object's ability to reflect radar signals in the direction of a radar receiver. In other words, radar cross section is a measure of how detectable the object is by radar. One such cavity in modern military aircraft is a port where bullets, fired from an aircraft gun, exit the aircraft.

As illustrated in FIG. 2, in one or more examples, aircraft 1200 includes gun-blast diffuser 200. Gun-blast diffuser 200 directs and/or diffuses high-pressure muzzle blast of an operating aircraft gun to prevent damage to structure and/or instruments of aircraft 1200. Gun-blast diffuser 200 is coupled, either directly or indirectly, to a muzzle of the aircraft gun and includes at least one port (e.g., referred to herein as an exit cavity) through which bullets and/or high-pressure gas exit gun-blast diffuser 200 and, thereby, exit aircraft 1200.

It is also recognized herein that removal of the aircraft gun from aircraft 1200 would eliminate cavities in aircraft 1200. However, lack of aircraft guns would leave aircraft 1200 vulnerable. Additionally, blocking the cavities with a stiff, durable material would inhibit the ability of the aircraft gun to properly function, especially on first firing rounds.

Plug 100 provides a way to reduce the radar cross section of aircraft 1200 (e.g., as shown in FIGS. 1 and 2). In one or more examples, plug 100 provides a way to reduce (e.g., minimize) the radar-cross section at ports where bullets, fired from an aircraft gun, exit the aircraft 1200 (e.g., blast-tube exit cavity 202). In one or more examples, plug 100 provides a way to reduce (e.g., minimize) the radar-cross section at ports where high-pressure gas, from the aircraft gun, exit aircraft 1200 (e.g., second-blast-tube exit cavity 208 and/or third-blast-tube exit cavity 214). In one or more examples, plug 100 is designed and fabricated to meet radar cross section requirements of aircraft 1200 while not impinging on the functionality and safety of the aircraft guns and/or aircraft engines.

In one or more examples, with plug 100 inserted into blast-tube exit cavity 202 of gun-blast diffuser 200, plug 100 eliminates a relatively large cavity on aircraft 1200 and forms a smooth surface that does not reflect or otherwise break out radar waves. When operation of the aircraft gun is needed, plug 100 is configured to break apart and break away from blast-tube exit cavity 202 without impeding a trajectory of the bullet and without damaging aircraft 1200.

Substrate 104 formed of conductive nonwoven fabric 136 forms a non-reflective surface and provides a conductivity that assists with radar reflection. Thus, substrate 104 provides, or serves as, an outer mold line (OML) surface of plug 100 that maintains properties that are suitable to satisfy the radar cross-section requirements of aircraft 1200. Body 102, formed of polyurethane foam 142, provides a sturdy and structurally sound member that is capable of being, at least partially, inserted into blast-tube exit cavity 202 and that is capable of withstanding environmental conditions and loads experienced during flight. Body 102 formed of polyurethane foam 142 and substrate 104 formed of conductive nonwoven fabric 136 enables plug 100 to shatter and/or disintegrate (e.g., break into small parts) during gunfire. Thus, plug 100 does not inhibit gun function and the small parts of plug 100, after destruction of plug 100 by gunfire, pose little risk to damage aircraft 1200 or engine ingestion.

Referring generally to FIG. 1 for illustrative purposes only and not by way of limitation, the following portion of this paragraph delineates example 2 of the subject matter, disclosed herein. According to example 2 which encompasses example 1, above, substrate 104 has an electrical conductivity of less than 2 ohms per square unit of area.

The electrical conductivity or resistance of substrate 104 being less than 2 ohm per square unit of area (e.g., ohm per square) provides proper radar reflection properties that satisfy associated requirements for reduction of radar cross section.

In one or more examples, substrate 104 is a relatively thin substrate (e.g., sheet material) that is nominally uniform in thickness. Ohm per square is a measure of resistance of relatively thin substrates that are nominally uniform in thickness, often referred to a sheet resistance, sheet resistivity, or x-ray resistance. In one or more examples, substrate 104 having a conductivity or resistance below a threshold conductivity or resistance of 2 ohms square ($\Omega$/sq) satisfies the radar cross-section requirements of aircraft 1200. In one or more examples, substrate 104 having a conductivity or resistance below a threshold conductivity or resistance of 1 ohm square ($\Omega$/sq) satisfies the radar cross-section requirements of aircraft 1200.

Referring generally to FIG. 1 for illustrative purposes only and not by way of limitation, the following portion of this paragraph delineates example 3 of the subject matter, disclosed herein. According to example 3 which encompasses examples 1 or 2, above, conductive nonwoven fabric 136 comprises carbon fibers.

Use of carbon fibers in conductive nonwoven fabric 136 provides for desired electrical conductivity or resistance of substrate 104.

In one or more examples, the carbon fibers, forming conductive nonwoven fabric 136, provide the conductivity or resistance of substrate 104 below the threshold of 2 $\Omega$/sq, such as below the threshold of 1 $\Omega$/sq. In one or more examples, conductive nonwoven fabric 136 takes the form of a scrim, a veil, or a mat of chopped or continuous carbon fibers. In one or more examples, conductive nonwoven fabric 136 comprises other types of fibers that provide a conductivity or resistance below the threshold of 2 $\Omega$/sq, such as below the threshold of 1 $\Omega$/sq.

Referring generally to FIG. 1 for illustrative purposes only and not by way of limitation, the following portion of this paragraph delineates example 4 of the subject matter, disclosed herein. According to example 4, which encompasses any one of examples 1 to 3, above, substrate 104 further comprises nickel coating 140, applied to conductive nonwoven fabric 136.

Nickel coating 140, applied to conductive nonwoven fabric 136, provides for desired conductivity or resistance of substrate 104.

In one or more examples, nickel coating 140, applied to conductive nonwoven fabric 136, provides for the resistance of substrate 104 below the threshold of 2 $\Omega$/sq, such as below the threshold of 1 $\Omega$/sq. In one or more examples, nickel coating 140, applied to conductive nonwoven fabric 136, provides electromagnetic interference (EMI) and/or radio frequency interference (RFI) shielding to substrate 104. In one or more examples, nickel coating 140, applied to conductive nonwoven fabric 136, provides corrosion resistance properties to substrate 104.

In one or more examples, nickel coating 140 is applied to at least one major surface of conductive nonwoven fabric 136 by any one of various suitable techniques. In one or more examples, substrate 104 includes any one or various other types of metallic coatings, applied to conductive nonwoven fabric 136.

Referring generally to FIG. 1 for illustrative purposes only and not by way of limitation, the following portion of this paragraph delineates example 5 of the subject matter, disclosed herein. According to example 5, which encompasses any one of examples 1 to 4, above, conductive nonwoven fabric 136 is embedded within polyurethane matrix 138.

Conductive nonwoven fabric 136 being embedded within polyurethane matrix 138 provides a resin-rich zone around conductive nonwoven fabric 136. The resin-rich zone, formed around conductive nonwoven fabric 136, facilitates application and coupling of substrate 104 to body 102.

In one or more examples, the resin-rich zone is formed on one major surface of conductive nonwoven fabric 136 when conductive nonwoven fabric 136 is embedded within polyurethane matrix 138. In one or more examples, the resin-rich zone is formed on both (e.g., opposed) major surfaces of conductive nonwoven fabric 136 when conductive nonwoven fabric 136 is embedded within polyurethane matrix 138. In one or more examples, embedding conductive nonwoven fabric 136 within polyurethane matrix 138 and forming the resin-rich zones on one or both sides of conductive nonwoven fabric 136 prevents and/or eliminates the existence of openings formed, or extending, through substrate 104.

In one or more examples, conductive nonwoven fabric 136 includes openings so that polyurethane matrix 138 can soak into and/or through conductive nonwoven fabric 136. In one or more examples, conductive nonwoven fabric 136 has an area density, suitable to absorb polyurethane matrix 138.

Referring generally to FIG. 1 for illustrative purposes only and not by way of limitation, the following portion of this paragraph delineates example 6 of the subject matter, disclosed herein. According to example 6, which encompasses any one of examples 1 to 5, above, polyurethane foam 142 is a closed-cell foam.

Utilization of a closed-cell foam for body 102 provides a suitable, or desired, density and frangibility to plug 100. Utilization of a closed-cell foam for body 102 also provides plug 100 with a suitable, or desired, resistance to liquid absorption.

As expressed above, polyurethane foam 142, such as the closed-cell foam, of body 102 is frangible and is configured to break apart in response to impact by a bullet during operation of the aircraft gun. Polyurethane foam 142, such as the closed-cell foam, of body 102 is capable of withstanding aerodynamic pressures applied to plug 100 during flight. Utilization of conductive nonwoven fabric 136 does not impede frangibility of plug 100 and enables plug 100 to shatter into a plurality of relatively small pieces.

In one or more examples, polyurethane foam 142, such as the closed-cell foam, is rigid. As used herein, terms "rigid," "rigidity," and like mean that the item is not flexible and/or is not able to bend or be forced out of shape without destroying the item.

In one or more examples, polyurethane foam 142, such as the closed-cell foam, is any one of various suitable types of foam material. In one or more examples, the type of foam material utilized for polyurethane foam 142, such as the closed-cell foam, of body 102 is selected, or chosen, based on at least one of rigidity, frangibility, density, and/or compressive strength desired for a particular implementation of plug 100 and/or anticipated aerodynamic loads applied to plug 100 during flight.

In one or more examples, polyurethane foam 142, such as the closed-cell foam, is a water-blown foam. In one or more examples, polyurethane foam 142, such as the closed-cell foam, is Stepan Foam AC-555, commercially available from Stepan Company of Illinois, USA. In one or more examples, polyurethane foam 142, such as the closed-cell foam, is JFOAM™ AC-555, commercially available from J6 Polymers, LLC of Illinois, USA.

Referring generally to FIG. 1 for illustrative purposes only and not by way of limitation, the following portion of this paragraph delineates example 7 of the subject matter, disclosed herein. According to example 7, which encompasses any one of examples 1 to 6, above, polyurethane foam 142 has a density of 84.9 kilograms per cubic meter (5.3 pounds per cubic foot) and a compressive strength from 68,947 pascals to 496,423 pascals (10 pounds per square inch to 72 pounds per square inch).

The density and/or compressive strength of polyurethane foam 142 of body 102 having suitable values provides sufficient strength to withstand aerodynamic pressures (e.g., wetted surface pressure) applied to plug 100 during flight. The density and/or compressive strength of polyurethane foam 142 of body 102 having suitable values also facilitates the frangibility of body 102 and the capability of plug 100 to break into pieces during operation of the aircraft gun.

In one or more examples, polyurethane foam 142 has strength sufficient to withstand up to 68,947 pascals (10 psi) of surface pressure applied to plug 100 during flight. In one or more examples, polyurethane foam 142 has strength sufficient to withstand more than 68,947 pascals (10 psi) of surface pressure applied to plug 100 during flight. Polyurethane foam 142 is also suitable frangible that plug 100 easily breaks apart in response to impact by a bullet, fired from the aircraft gun without impeding the bullet.

Unless otherwise stated herein, values for measurable properties, such as density, compressive strength, dimensions (e.g., length, width, thickness), pressure, and the like, refer to or include approximate values. Approximate values, such as use herein of the term "approximately," refer to or represent a condition that is close to, but not exactly, the stated condition that still performs the desired function or achieves the desired result. For instance, an approximate value refers to a condition that is within an acceptable predetermined tolerance or accuracy, such as to a condition that is within 10% of the stated condition. However, approximate values or the term "approximately" do not exclude a condition that is exactly the stated condition. As used herein, the term "substantially" refers to a condition that is essentially the stated condition that performs the desired function or achieves the desired result.

Referring generally to FIG. 1 for illustrative purposes only and not by way of limitation, the following portion of this paragraph delineates example 8 of the subject matter, disclosed herein. According to example 8, which encompasses any one of examples 1 to 7, above, plug 100 has a thickness from 0.012 meter (0.49 inch) to 0.031 meter (1.23 inch).

The thickness of plug 100 provides sufficient interference with blast-tube exit cavity 202 and sufficient strength to withstand aerodynamic pressures during flight. The thickness of plug 100 also facilitating frangibility of plug 100 and the capability of plug 100 to break into relatively small pieces during operation of the aircraft gun. The thickness of plug 100 also facilitates minimizing the weight of plug 100. In one or more examples, the thickness of plug 100 is selected based on a balance of strength, frangibility, and weight.

In one or more examples, plug 100 has a length of 0.137 meter (5.4 inches), a width of 0.071 meter (2.79 inches), and the thickness of 0.031 meter (1.23 inch). The length and the width of plug 100 corresponds to and is defined by a length and width of blast-tube exit cavity 202. The thickness of plug 100 generally forms plug side surface 116 (e.g., a faying surface to mate with gun-blast diffuser 200). The thickness of plug 100 is selected or determined based on a desired weight of plug 100, a desired frangibility of plug 100, and the faying surface area needed based on aerodynamic pressure loads applied to plug 100 during flight.

Referring generally to FIG. 1 and particularly to, e.g., FIG. 4 for illustrative purposes only and not by way of limitation, the following portion of this paragraph delineates example 9 of the subject matter, disclosed herein. According to example 9, which encompasses any one of examples 1 to 8, above, plug front surface 112 has a front-surface area. Plug side surface 116 has a side-surface area. A ratio of the front-surface area to the side-surface area is from 1.4:1 to 2.6:1.

Plug front surface 112 serves as the outer mold line (OML) of plug 100. Plug side surface 116 provides, serves as, or forms a bonding, or interface, surface that mates with and that is coupled to gun-blast diffuser 200 when plug 100 is inserted into blast-tube exit cavity 202 of gun-blast diffuser 200. Plug 100 having the selected ratio of the front-surface area to the side-surface area provides plug 100 with sufficient strength to hold plug 100 within blast-tube exit cavity 202 and to react to wetted surface pressure applied to plug front surface 112 of plug 100 during flight.

Unless otherwise stated herein, a ratio between two amounts or parameters includes approximately the recited ratio, substantially the recited ratio, or exactly the recited ratio.

Referring generally to FIG. 1 and particularly to, e.g., FIG. 4 for illustrative purposes only and not by way of limitation, the following portion of this paragraph delineates example 10 of the subject matter, disclosed herein. According to example 10, which encompasses any one of examples 1 to 9, above, substrate 104 and body 102 are co-bonded to each other.

Substrate 104 and body 102 being co-bonded to each other reduces cycle time during fabrication of plug 100. Substrate 104 and body 102 being co-bonded to each other also improves a bond between substrate 104 and body 102. Substrate 104 and body 102 being co-bonded to each other also reduces downstream processing of plug 100.

In one or more examples, substrate 104 and body 102 are co-bonded to each other during formation and cure of polyurethane foam 142 of body 102. As such, upon formation of body 102, substrate 104 is concurrently bonded to body 102 to form plug 100. In one or more examples, a portion of body 102 and/or substrate 104 is trimmed or shaped to prepare plug 100 for insertion in blast-tube exit cavity 202.

Referring generally to FIG. 1 and particularly to, e.g., FIG. 4 for illustrative purposes only and not by way of limitation, the following portion of this paragraph delineates example 11 of the subject matter, disclosed herein. According to example 11, which encompasses any one of examples 1 to 9, above, substrate 104 is secondarily bonded to body 102.

Substrate 104 being secondary bonding to body 102 facilitates automation and mass production of substrate 104 and body 102.

In one or more examples, substrate 104 (e.g., a plurality of substrates) and body 102 (e.g., a plurality of bodies) are fabricated using dedicated processes. Substrate 104 is subsequently bonded to body 102 to form plug 100. In one or more examples, substrate 104 is secondarily bonded to body 102 in any one of various bonding techniques, such as via adhesive bonding.

Referring generally to FIG. 1 and particularly to, e.g., FIG. 4 for illustrative purposes only and not by way of limitation, the following portion of this paragraph delineates example 12 of the subject matter, disclosed herein. According to example 12, which encompasses any one of examples 1 to 11, above, plug 100 further comprises plug protrusion 106, extending from portion of plug side surface 116 of plug 100.

Plug protrusion 106 facilitates interference fit between plug 100 and gun-blast diffuser 200 when plug 100 is inserted into blast-tube exit cavity 202.

In one or more examples, plug protrusion 106 has any configuration, dimensions, and/or geometry suitable to create an interference fit between plug side surface 116 of plug 100 and an interface surface of gun-blast diffuser 200 that at least partially forms blast-tube exit cavity 202. In one or more examples, plug protrusion 106 extends between plug front surface 112 and plug rear surface 114. In one or more examples, a front end of plug protrusion 106 is located proximate (e.g., at, near, or adjacent) to plug front surface 112 and a rear end of plug protrusion 106 is located proximate to plug rear surface 114 (e.g., as shown by example in FIG. 4).

In one or more examples, plug protrusion 106 has a constant cross-sectional thickness and/or geometry along its length and/or width. In one or more examples, cross-sectional thickness and/or geometry of plug protrusion 106 change along its length and/or width. In one or more examples, a thickness, or height, of plug protrusion 106 gradually or progressively increases from an end-portion and/or a side-portion of plug protrusion 106 to a middle-portion of plug protrusion 106.

In one or more examples, plug 100 includes more than one plug protrusion 106, extending from more than one portion of plug side surface 116 of plug 100. In one or more examples, plug 100 includes at least one opposed pair of protrusions 106, extending from opposing portions (e.g., facing opposite directions) of plug side surface 116 of plug 100.

Referring generally to FIG. 1 and particularly to, e.g., FIGS. 2-4 for illustrative purposes only and not by way of limitation, the following portion of this paragraph delineates example 13 of the subject matter, disclosed herein. According to example 13, gun-blast diffuser 200 for aircraft 1200 is disclosed. Gun-blast diffuser 200 comprises blast tube 204, comprising blast-tube exit cavity 202. Gun-blast diffuser 200 additionally comprises plug 100, which comprises plug front surface 112, plug rear surface 114, and plug side surface 116 that extends between plug front surface 112 and plug rear surface 114. Plug 100 also comprises body 102, comprising polyurethane foam 142. Plug 100 further comprises substrate 104, coupled to body 102 and comprising conductive nonwoven fabric 136, impregnated with polyurethane matrix 138. At least a portion of plug 100 is located within blast-tube exit cavity 202. Plug front surface 112 is defined by substrate 104. Plug rear surface 114 is defined by body 102. Plug side surface 116 is defined by substrate 104 and body 102.

Gun-blast diffuser 200 directs and/or diffuses muzzle blast of an aircraft-mounted gun. Blast tube 204 and blast-tube exit cavity 202 provide clearance and passage for the projectile through gun-blast diffuser 200. Plug 100 fills blast-tube exit cavity 202 to reduce the radar cross section of aircraft 1200 and, more particularly, the radar cross section of blast-tube exit cavity 202 of gun-blast diffuser 200. Impregnating conductive nonwoven fabric 136 with polyurethane matrix 138 increases durability and handleability of substrate 104. Conductivity of conductive nonwoven fabric 136 reflects radar waves to block detection of the internal geometry of blast-tube exit cavity 202. Polyurethane foam 142 is frangible to facilitate destruction of plug 100 upon discharge of the projectile through blast tube 204 and exiting blast-tube exit cavity 202.

In one or more examples, gun-blast diffuser 200 is located, or is otherwise mounted, on aircraft 1200 (e.g., as shown in FIG. 2). In one or more examples, one end of blast tube 204 (e.g., as shown in FIG. 3) of gun-blast diffuser 200 is coupled, either directly or indirectly, to the muzzle of the aircraft gun. An opposed end of blast tube 204 forms blast-tube exit cavity 202. The bullet fired from the aircraft gun passes through blast tube 204 and exits blast-tube exit cavity 202.

In one or more examples, gun-blast diffuser 200 includes blast manifold 216. In one or more examples, blast manifold 216 serves as a housing for at least a portion of blast tube 204. Blast manifold 216 forms, or serves as, an expansion chamber in which high-pressure muzzle blast dissipates. A portion of blast manifold 216 forms exterior surface 218 (e.g., exposed face) of gun-blast diffuser 200. In one or more examples, exterior surface 218 of blast manifold 216 is contiguous with a skin of aircraft 1200 (e.g., as shown in FIG. 2). In one or more examples, blast-tube exit cavity 202 is formed in exterior surface 218 of blast manifold 216 (e.g., as shown in FIG. 3).

In one or more examples, with plug 100 inserted into blast-tube exit cavity 202 of gun-blast diffuser 200, plug front surface 112 of plug 100 is contiguous with exterior surface 218 of blast manifold 216 and at least a portion of plug side surface 116 is coupled to a portion of an interior (or internal) surface of blast tube 204, forming a periphery of blast-tube exit cavity 202.

Referring generally to FIG. 1 for illustrative purposes only and not by way of limitation, the following portion of this paragraph delineates example 14 of the subject matter, disclosed herein. According to example 14 which encompasses example 13, above, substrate 104 has the electrical conductivity of less than 2 ohms per square unit of area.

The electrical conductivity or resistance of substrate 104 being less than 2 ohm per square unit of area (e.g., ohm per square) provides proper radar reflection properties that satisfy associated requirements for reduction of radar cross section.

Referring generally to FIG. 1 for illustrative purposes only and not by way of limitation, the following portion of this paragraph delineates example 15 of the subject matter, disclosed herein. According to example 15, which encompasses example 13 or 14, above, conductive nonwoven fabric 136 comprises carbon fibers.

Use of carbon fibers in conductive nonwoven fabric 136 provides for desired electrical conductivity or resistance of substrate 104.

Referring generally to FIG. for illustrative purposes only and not by way of limitation, the following portion of this paragraph delineates example 16 of the subject matter, disclosed herein. According to example 16, which encompasses any one of examples 13 to 15, above, substrate 104 further comprises nickel coating 140, applied to conductive nonwoven fabric 136.

Nickel coating 140, applied to conductive nonwoven fabric 136, provides for desired conductivity or resistance of substrate 104.

Referring generally to FIG. 1 for illustrative purposes only and not by way of limitation, the following portion of this paragraph delineates example 17 of the subject matter, disclosed herein. According to example 17, which encompasses any one of examples 13 to 16, above, conductive nonwoven fabric 136 is embedded within polyurethane matrix 138.

Conductive nonwoven fabric 136 being embedded within polyurethane matrix 138 provides a resin-rich zone around conductive nonwoven fabric 136. The resin-rich zone, formed around conductive nonwoven fabric 136, facilitates application and coupling of substrate 104 to body 102.

Referring generally to FIG. 1 for illustrative purposes only and not by way of limitation, the following portion of this paragraph delineates example 18 of the subject matter, disclosed herein. According to example 18, which encompasses any one of examples 13 to 17, above, polyurethane foam 142 is a closed-cell foam.

Utilization of a closed-cell foam for body 102 provides a suitable, or desired, density and frangibility to plug 100. Utilization of a closed-cell foam for body 102 also provides plug 100 with a suitable, or desired, resistance to liquid absorption.

Referring generally to FIG. 1 for illustrative purposes only and not by way of limitation, the following portion of this paragraph delineates example 19 of the subject matter, disclosed herein. According to example 19, which encompasses any one of examples 13 to 18, above, polyurethane foam 142 has the density of 84.9 kilograms per cubic meter (5.3 pounds per cubic foot) and the compressive strength from 68,947 pascals to 496,423 pascals (10 pounds per square inch to 72 pounds per square inch).

The density and/or compressive strength of polyurethane foam 142 of body 102 having suitable values provides sufficient strength to withstand aerodynamic pressures (e.g., wetted surface pressure) applied to plug 100 during flight. The density and/or compressive strength of polyurethane foam 142 of body 102 having suitable values also facilitates the frangibility of body 102 and the capability of plug 100 to break into pieces during operation of the aircraft gun.

Referring generally to FIG. 1 for illustrative purposes only and not by way of limitation, the following portion of this paragraph delineates example 20 of the subject matter, disclosed herein. According to example 20, which encompasses any one of examples 13 to 19, above, plug 100 has a thickness from 0.012 meter (0.49 inch) to 0.031 meter (1.23 inch).

The thickness of plug 100 provides sufficient interference with blast-tube exit cavity 202 and sufficient strength to withstand aerodynamic pressures during flight. The thickness of plug 100 also facilitating frangibility of plug 100 and the capability of plug 100 to break into relatively small pieces during operation of the aircraft gun. The thickness of plug 100 also facilitates minimizing the weight of plug 100. In one or more examples, the thickness of plug 100 is selected to account for strength, frangibility, and weight.

Referring generally to FIG. 1 and particularly to, e.g., FIGS. 3 and 4 for illustrative purposes only and not by way of limitation, the following portion of this paragraph delineates example 21 of the subject matter, disclosed herein. According to example 21, which encompasses any one of examples 13 to 20, above, at least portion of plug side surface 116 is bonded to at least portion of blast tube 204.

Plug front surface 112 serves as the outer mold line (OML) of plug 100. Plug side surface 116 provides, serves as, or forms the bonding, or interface, surface that mates with and that is coupled to a portion of the internal surface of blast tube 204 that forms blast-tube exit cavity 202 when plug 100 is inserted into blast-tube exit cavity 202 of gun-blast diffuser 200.

Referring generally to FIG. 1 and particularly to, e.g., FIGS. 3 and 4 for illustrative purposes only and not by way of limitation, the following portion of this paragraph delineates example 22 of the subject matter, disclosed herein. According to example 22, which encompasses any one of examples 13 to 21, above, plug front surface 112 has a front-surface area. Plug side surface 116 has a side-surface area. The ratio of the front-surface area to the side-surface area is from 1.4:1 to 2.6:1.

Plug 100 having the selected ratio of the front-surface area to the side-surface area provides plug 100 with sufficient strength to hold plug 100 within blast-tube exit cavity 202 and to react to wetted surface pressure applied to plug front surface 112 of plug 100 during flight.

Referring generally to FIG. 1 for illustrative purposes only and not by way of limitation, the following portion of this paragraph delineates example 23 of the subject matter, disclosed herein. According to example 23, which encompasses any one of examples 13 to 22, above, gun-blast diffuser 200 further comprises sealant 210, located between at least portion of plug side surface 116 and at least portion of blast tube 204.

Sealant 210 bonds plug 100 within blast-tube exit cavity 202.

In one or more examples, at least a portion of plug side surface 116 has a shape that is complementary to a shape of a portion of the internal surface of blast tube 204, which forms the periphery of blast-tube exit cavity 202. In one or more examples, at least a portion of plug side surface 116 serves as a faying surface and a portion of the internal surface of the blast tube 204 serves as a matching faying surface. Sealant 210 is applied, placed, or otherwise disposed on at least one of plug side surface 116 and/or the internal surface of blast tube 204, defining the faying surfaces, prior to plug 100 being inserted into blast-tube exit cavity 202.

In one or more examples, gun-blast diffuser 200 includes a pre-adhesion promoter that is applied to at least portion of plug side surface 116 and/or at least portion of blast tube 204 before application of sealant 210. The pre-adhesion promoter provides for better adhesion between plug 100 and blast tube 204.

In one or more examples, sealant 210 provides a bond strength that is greater than a strength (e.g., compression strength) of plug 100, such as the strength of polyurethane foam 142 forming body 102 of plug 100. In one or more examples, the bond strength of sealant 210 is greater than a blast pressure (e.g., approximately $1.38 \times 10^6$ pascals or 200 psi) transferring through blast tube 204 during operation of the aircraft gun and the strength of plug 100 is less than the blast pressure. Accordingly, plug 100 tends to break apart (e.g., shatter or disintegrate) into relatively small pieces in response to the blast pressure, rather than being ejected, as a whole, from blast-tube exit cavity 202. Additionally, in one or more examples, the bond strength of sealant 210 is greater than the aerodynamic pressures and/or loads acting on plug 100 during flight to prevent plug 100 from moving within blast-tube exit cavity 202.

In one or more examples, sealant 210 includes, or takes the form of, a curable sealant. In one or more examples, sealant 210 is configured to cure at room temperature. In one or more examples, sealant 210 is a vulcanizing sealant. In one or more examples, sealant 210 is a polythioether sealant. In one or more examples, sealant 210 is configured to leave relatively little sealant residue on the internal surface of blast tube 204 after destruction and ejection of plug 100 from blast-tube exit cavity 202. In one or more examples, sealant 210 is PR-2202 Class B electrically conductive rapid cure, corrosion inhibitive sealant.

Referring generally to FIG. 1 for illustrative purposes only and not by way of limitation, the following portion of this paragraph delineates example 24 of the subject matter, disclosed herein. According to example 24, which encompasses example 23, above, sealant 210 is electrically conductive.

Sealant 210 being electrically conductive provides proper radar reflection properties that satisfy associated requirements for reduction of radar cross section.

In one or more examples, sealant 210 is an electrically conductive polythioether sealant.

Referring generally to FIG. 1 and particularly to, e.g., FIG. 4 for illustrative purposes only and not by way of limitation, the following portion of this paragraph delineates example 25 of the subject matter, disclosed herein. According to example 25, which encompasses any one of examples 13 to 24, above, substrate 104 and body 102 are co-bonded to each other.

Substrate 104 and body 102 being co-bonded to each other reduces cycle time during fabrication of plug 100. Substrate 104 and body 102 being co-bonded to each other also improves a bond between substrate 104 and body 102. Substrate 104 and body 102 being co-bonded to each other also reduces downstream processing of plug 100.

Referring generally to FIG. 1 and particularly to, e.g., FIG. 4 for illustrative purposes only and not by way of limitation, the following portion of this paragraph delineates example 26 of the subject matter, disclosed herein. According to example 26, which encompasses any one of examples 13 to 24, above, substrate 104 is secondarily bonded to body 102.

Substrate 104 being secondary bonding to body 102 facilitates automation and mass production of substrate 104 and body 102.

Referring generally to FIG. 1 and particularly to, e.g., FIG. 4 for illustrative purposes only and not by way of limitation, the following portion of this paragraph delineates example 27 of the subject matter, disclosed herein. According to example 27, which encompasses any one of examples 13 to 26, above, plug 100 further comprises plug protrusion 106, extending from portion of plug side surface 116 of plug 100.

Plug protrusion 106 facilitates interference fit between plug 100 and gun-blast diffuser 200 when plug 100 is inserted into blast-tube exit cavity 202.

In one or more examples, plug protrusion 106 is configured to hold plug 100 in place in blast-tube exit cavity 202 and prevents plug 100 from moving within blast-tube exit cavity 202 during installation of plug 100, such as during cure of sealant 210. In one or more examples, blast tube 204 includes a recess or other feature formed the portion of the internal surface of blast tube 204 forming the periphery of blast-tube exit cavity 202.

In one or more examples, plug protrusion 106 of plug 100 has shape that is complementary to the recess that is formed in the internal surface of blast tube 204, forming the periphery of blast-tube exit cavity 202. In one or more examples, plug protrusion 106 serves as a portion of the faying surface of plug 100. In one or more examples, sealant 210 is applied, placed, or otherwise disposed on plug protrusion 106.

Figure 5:
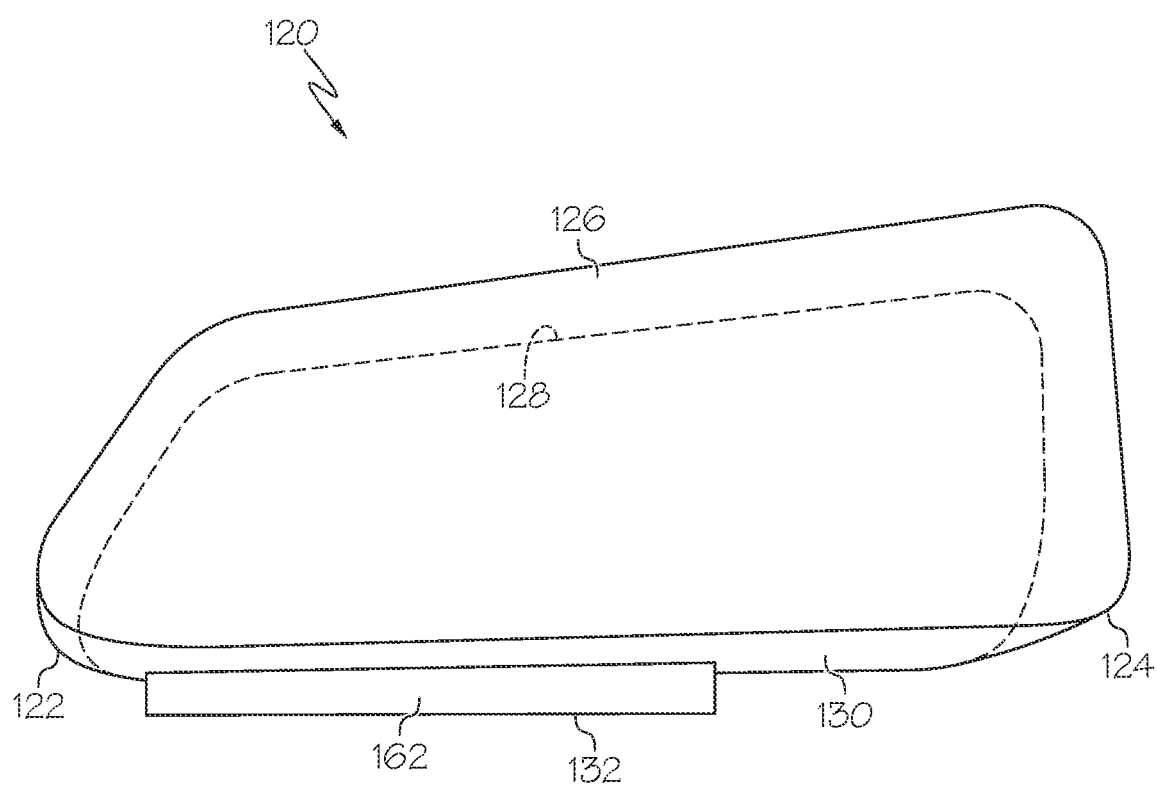
FIG. 5 is a schematic, perspective view of a second plug for the aircraft gun-blast diffuser of FIG. 1, according to one or more examples of the subject matter, disclosed herein.

Referring generally to FIG. 1 and particularly to, e.g., FIGS. 2, 3, and 5 for illustrative purposes only and not by way of limitation, the following portion of this paragraph delineates example 28 of the subject matter, disclosed herein. According to example 28, which encompasses any one of examples 13 to 27, above, gun-blast diffuser further comprises second blast tube 206, comprising second-blast-tube exit cavity 208. Gun-blast diffuser also comprises second plug 120, which comprises second-plug front surface 126, second-plug rear surface 128, and second-plug side surface 130 that extends between second-plug front surface 126 and second-plug rear surface 128. Second plug 120 additionally comprises second body 122, comprising polyurethane foam 142. Second plug 120 further comprises second substrate 124, coupled to second body 122 and comprising conductive nonwoven fabric 136, impregnated with polyurethane matrix 138. At least a portion of second plug 120 is located within second-blast-tube exit cavity 208. Second-plug front surface 126 is formed by second substrate 124. Second-plug rear surface 128 is formed by second body 122. Second-plug side surface 130 is formed by second substrate 124 and second body 122.

Second blast tube 206 and second-blast-tube exit cavity 208 provide clearance for high-pressure combustion gasses to pass through gun-blast diffuser 200. Second plug 120 fills second-blast-tube exit cavity 208 to reduce the radar cross section of aircraft 1200 and, more particularly, a radar cross section of second-blast-tube exit cavity 208 of gun-blast diffuser 200. Impregnating conductive nonwoven fabric 136 with polyurethane matrix 138 increases durability and handleability of second substrate 124. Conductivity of conductive nonwoven fabric 136 reflects radar waves to block detection of an internal geometry of second-blast-tube exit cavity 208. Polyurethane foam 142 is frangible to facilitate destruction of second plug 120 upon discharge of combustion gas through second blast tube 206 and second-blast-tube exit cavity 208.

In one or more examples, one end of second blast tube 206 (e.g., as shown in FIG. 3) of gun-blast diffuser 200 is coupled to and is in volumetric communication with blast tube 204. An opposed end of second blast tube 206 forms second-blast-tube exit cavity 208. High-pressure gas from the aircraft gun is diverted by second blast tube 206 and passes through second blast tube 206 and exits second-blast-tube exit cavity 208.

In one or more examples, blast manifold 216 serves as a housing for at least a portion of second blast tube 206. Blast manifold 216 forms, or serves as, the expansion chamber, in which high-pressure muzzle blast dissipates and is diverted. In one or more examples, second-blast-tube exit cavity 208 is formed in exterior surface 218 of blast manifold 216 (e.g., as shown in FIG. 3).

In one or more examples, with second plug 120 inserted into second-blast-tube exit cavity 208 of gun-blast diffuser 200, second-plug front surface 126 of second plug 120 is contiguous with exterior surface 218 of blast manifold 216 and at least a portion of second-plug side surface 130 is coupled to a portion of an interior surface of second blast tube 206, forming a periphery of second-blast-tube exit cavity 208.

Second plug 120 provides a way to reduce the radar cross section of aircraft 1200 (e.g., as shown in FIGS. 1 and 2). In one or more examples, second plug 120 provides a way to reduce (e.g., minimize) the radar-cross section at ports where high-pressure gas, from the aircraft gun, exits aircraft 1200 (e.g., second-blast-tube exit cavity 208). In one or more examples, second plug 120 is designed and fabricated to meet radar cross section requirements of aircraft 1200 while not impinging on the functionality and safety of the aircraft guns and/or aircraft engines.

In one or more examples, with second plug 120 inserted into second-blast-tube exit cavity 208 of gun-blast diffuser 200, second plug 120 eliminates a relatively large cavity on aircraft 1200 and forms a smooth surface that does not reflect or otherwise break out radar waves. When operation of the aircraft gun is needed, second plug 120 is configured to break apart and break away from second-blast-tube exit cavity 208 without impeding proper operation of the aircraft gun and without damaging aircraft 1200.

In one or more examples, blast-tube exit cavity 202 and second-blast-tube exit cavity 208 have different sizes, geometries, and/or shapes due to their respective function. Accordingly, in one or more examples, plug 100 and second plug 120 have different sizes, geometries, and/or shapes.

Second substrate 124 formed of conductive nonwoven fabric 136 forms a non-reflective surface and provides a conductivity that assists with radar reflection. Thus, second substrate 124 provides, or serves as, an outer mold line (OML) surface of second plug 120 that maintains properties that are suitable to satisfy the radar cross-section requirements of aircraft 1200. Second body 122, formed of polyurethane foam 142, provides a sturdy and structurally sound member that is capable of being, at least partially, inserted into second-blast-tube exit cavity 208 and that is capable of withstanding environmental conditions and loads experienced during flight. Second body 122 formed of polyurethane foam 142 and second substrate 124 formed of conductive nonwoven fabric 136 enables second plug 120 to shatter and/or disintegrate (e.g., break into small parts) during gunfire. Thus, second plug 120 does not inhibit gun function and the small parts of second plug 120, after destruction of second plug 120 by the high-pressure gas of gunfire, pose little risk to damage aircraft 1200 or engine ingestion.

Generally, second plug 120 (e.g., as shown in FIGS. 1, 3, and 5) is made in a manner and has material properties that are substantially similar to that described herein and illustrated with respect to plug 100 (e.g., as shown in FIGS. 1, 2, 4, 7, and 8).

In one or more examples, second substrate 124 has an electrical conductivity of less than 2 Ω/sq, such as below the threshold of 1 Ω/sq. The electrical conductivity or resistance of second substrate 124 being less than 2 Ω/sq, such as below the threshold of 1 Ω/sq, provides proper radar reflection properties that satisfy associated requirements for reduction of radar cross section.

In one or more examples, second substrate 124 includes nickel coating 140, applied to conductive nonwoven fabric 136. Nickel coating 140, applied to conductive nonwoven fabric 136, provides for desired conductivity or resistance of second substrate 124.

In one or more examples, conductive nonwoven fabric 136 of second substrate 124 is embedded within polyurethane matrix 138. Conductive nonwoven fabric 136 being embedded within polyurethane matrix 138 provides a resin-rich zone around conductive nonwoven fabric 136. The resin-rich zone, formed around conductive nonwoven fabric 136, facilitates application and coupling of second substrate 124 to second body 122.

In one or more examples, polyurethane foam 142 of second body 122 includes closed-cell foam. Utilization of a closed-cell foam for second body 122 provides a suitable, or desired, density and frangibility to second plug 120. Utilization of a closed-cell foam for second body 122 also provides second plug 120 with a suitable, or desired, resistance to liquid absorption.

In one or more examples, polyurethane foam 142 of second body 122 has a density of 84.9 kilograms per cubic meter (5.3 pounds per cubic foot) and a compressive strength from 68,947 pascals to 496,423 pascals (10 pounds per square inch to 72 pounds per square inch). In one or more examples, second plug 120 has a thickness from 0.012 meter (0.49 inch) to 0.031 meter (1.23 inch).

In one or more examples, second plug 120 has a length of 0.126 meter (4.98 inches), a width of 0.082 meter (3.32 inches), and the thickness of 0.012 meter (0.49 inch). The length and the width of second plug 120 correspond to and are defined by a length and width of second-blast-tube exit cavity 208. The thickness of second plug 120 generally forms second-plug side surface 130 (e.g., a faying surface to mate with gun-blast diffuser 200). The thickness of second plug 120 is selected or determined based on a desired weight of second plug 120, a desired frangibility of second plug 120, and the faying surface area needed based on aerodynamic pressure loads, applied to second plug 120 during flight.

In one or more examples, second-plug front surface 126 has a second front-surface area. Second-plug side surface 130 has a second side-surface area. A ratio of the second front-surface area to the second side-surface area is from 1.4:1 to 2.6:1. Second-plug front surface 126 serves as an outer mold line (OML) of second plug 120. Second-plug side surface 130 provides, serves as, or forms a bonding, or interface, surface that mates with and that is coupled to gun-blast diffuser 200 when second plug 120 is inserted into second-blast-tube exit cavity 208 of gun-blast diffuser 200. Second plug 120 having the selected ratio of the second front-surface area to the second side-surface area provides second plug 120 with sufficient strength to hold second plug 120 within second-blast-tube exit cavity 208 and to react to wetted surface pressure applied to second-plug front surface 126 of second plug 120 during flight.

In one or more examples, second substrate 124 and second body 122 are co-bonded to each other. In one or more examples, second substrate 124 is secondarily bonded to second body 122.

In one or more examples, gun-blast diffuser 200 includes sealant 210, located between at least portion of second-plug side surface 130 and at least portion of second blast tube 206. Sealant 210 bonds second plug 120 within second-blast-tube exit cavity 208.

Referring generally to FIG. 1 and particularly to, e.g., FIG. 5 for illustrative purposes only and not by way of limitation, the following portion of this paragraph delineates example 29 of the subject matter, disclosed herein. According to example 29, which encompasses example 28, above, second plug 120 further comprises second-plug protrusion 132, extending from a portion of second-plug side surface 130.

Second-plug protrusion 132 facilitates an interference fit between second plug 120 and second blast tube 206 when second plug 120 is inserted into second-blast-tube exit cavity 208.

In one or more examples, second-plug protrusion 132 is configured to hold second plug 120 in place in second-blast-tube exit cavity 208 and prevents second plug 120 from moving within second-blast-tube exit cavity 208 during installation of second plug 120, such as during cure of sealant 210.

In one or more examples, second-plug protrusion 132 has any configuration, dimensions, and/or geometry suitable to create an interference fit between second-plug side surface 130 and an interface surface of gun-blast diffuser 200 that at least partially forms second-blast-tube exit cavity 208. In one or more examples, second-plug protrusion 132 is located between second-plug front surface 126 and second-plug rear surface 128.

In one or more examples, second-plug protrusion 132 has a constant cross-sectional thickness and/or geometry along its length and/or width. In one or more examples, cross-sectional thickness and/or geometry of second-plug protrusion 132 change along its length and/or width. In one or more examples, a thickness, or height, of second-plug protrusion 132 gradually or progressively increases from an end-portion and/or a side-portion of second-plug protrusion 132 to a middle-portion of second-plug protrusion 132.

In one or more examples, second plug 120 includes more than one second-plug protrusion 132, extending from more than one portion of second-plug side surface 130. In one or more examples, second plug 120 includes at least one opposed pair of second-plug protrusions, extending from opposing portions (e.g., facing opposite directions) of second-plug side surface 130.

In one or more examples, second blast tube 206 includes a recess or other feature formed the portion of the internal surface of second blast tube 206 forming the periphery of second exit-blast-tube cavity 208. In one or more examples, second-plug protrusion 132 has shape that is complementary to the recess that is formed in the internal surface of second blast tube 206, forming the periphery of second-blast-tube exit cavity 208. In one or more examples, second-plug protrusion 132 serves as a portion of the faying surface of second plug 120. In one or more examples, sealant 210 is applied, placed, or otherwise disposed on second-plug protrusion 132.

In one or more examples, second-plug protrusion 132 takes the form of a tab, or other projection, that includes shoulder 162 (e.g., as shown in FIG. 5). Second plug 120 is shaped and/or otherwise configured to fit within a complementary shaped recess, formed in the internal surface of second blast tube 206 such that shoulder 162 comes into intimate contact with a corresponding ledge, formed by the internal surface of second blast tube 206 and forming a portion of the recess, formed in the internal surface of second blast tube 206.

Referring generally to FIG. 1 and particularly to, e.g., FIGS. 2 and 3 for illustrative purposes only and not by way of limitation, in one or more examples, gun-blast diffuser further comprises third blast tube 212, comprising third-blast-tube exit cavity 214, and third plug 148. Third plug 148 comprises third-plug front surface 154, third-plug rear surface 156, and third-plug side surface 158 that extends between third-plug front surface 154 and third-plug rear surface 156. Third plug 148 also comprises third body 150, comprising polyurethane foam 142, and third substrate 152, coupled to third body 150 and comprising conductive nonwoven fabric 136, impregnated with polyurethane matrix 138. At least a portion of third plug 148 is located within third-blast-tube exit cavity 214. Third-plug front surface 154 of third plug 148 is formed by third substrate 152. Third-plug rear surface 156 of third plug 148 is formed by third body 150. Third-plug side surface 158 of third plug 148 is formed by third substrate 152 and third body 150.

Third blast tube 212 and third-blast-tube exit cavity 214 provide clearance for high-pressure combustion gasses to pass through gun-blast diffuser 200. Third plug 148 fills third-blast-tube exit cavity 214 to reduce the radar cross section of aircraft 1200 and, more particularly, a radar cross section of third-blast-tube exit cavity 214 of gun-blast diffuser 200. Impregnating conductive nonwoven fabric 136 with polyurethane matrix 138 increases durability and handleability of third substrate 152. Conductivity of conductive nonwoven fabric 136 reflects radar waves to block detection of an internal geometry of third-blast-tube exit cavity 214. Polyurethane foam 142 is frangible to facilitate destruction of third plug 148 upon discharge of combustion gas through third blast tube 212 and third-blast-tube exit cavity 214.

In one or more examples, one end of third blast tube 212 (e.g., as shown in FIG. 3) of gun-blast diffuser 200 is coupled to and is in volumetric communication with blast tube 204. An opposed end of third blast tube 212 forms third-blast-tube exit cavity 214. High-pressure gas from the aircraft gun is diverted by third blast tube 212 and passes through third blast tube 212 and exits third-blast-tube exit cavity 214. In one or more examples, blast manifold 216 serves as a housing for at least a portion of third blast tube 212. Blast manifold 216 forms, or serves as, the expansion chamber in which high-pressure muzzle blast dissipates and is diverted. In one or more examples, third-blast-tube exit cavity 214 is formed in exterior surface 218 of blast manifold 216 (e.g., as shown in FIG. 3).

In one or more examples, blast-tube exit cavity 202 and third-blast-tube exit cavity 214 have different sizes, geometries, and/or shapes due to their respective function. Accordingly, in one or more examples, plug 100 and third plug 148 have different sizes, geometries, and/or shapes. In one or more examples, second-blast-tube exit cavity 208 and third-blast-tube exit cavity 214 have the same size, geometry, and/or shape due to their respective similar function. Accordingly, in one or more examples, second plug 120 and third plug 148 have substantially the same size, geometry, and/or shape. In one or more examples, third plug 14F8 is a mirror image of second plug 120.

Generally, third plug 148 (e.g., as shown in FIGS. 1 and 3) is made in a manner and has material properties that are substantially similar to that described herein and illustrated with respect to second plug 120 (e.g., as shown in FIGS. 1, 2, 4, 7, and 8).

In one or more examples, third plug 148 includes third-plug protrusion 160, extending from a portion of third-plug side surface 158 of third plug 148. Third-plug protrusion 160 facilitates an interference fit between third plug 148 and third blast tube 212 when third plug 148 is inserted into third-blast-tube exit cavity 214.

Referring generally to FIG. 6 and particularly to, e.g., FIGS. 1-4 for illustrative purposes only and not by way of limitation, the following portion of this paragraph delineates example 30 of the subject matter, disclosed herein. According to example 30, method 1000 of making plug 100 for insertion into blast-tube exit cavity 202 of gun-blast diffuser 200 is disclosed. Plug 100 comprising plug front surface 112, plug rear surface 114, and plug side surface 116 that extends between plug front surface 112 and plug rear surface 114. Method 1000 comprises a step of (block 1002) impregnating conductive nonwoven fabric 136 with polyurethane matrix 138 to form substrate 104 and a step of (block 1006) coupling substrate 104 to body 102, comprising polyurethane foam 142, so that: plug front surface 112 is formed by substrate 104; plug rear surface 114 is formed by body 102; and plug side surface 116 is formed by substrate 104 and body 102.

Impregnating conductive nonwoven fabric 136 with polyurethane matrix 138 results in forming substrate 104 (block 1004). Coupling substrate 104 to body 102 results in forming plug 100 (block 1008). Impregnating conductive nonwoven fabric 136 with polyurethane matrix 138 increases durability and handleability of substrate 104, prior to coupling substrate 104 to body 102. Use of conductive nonwoven fabric 136 facilitates reflecting radar waves to block detection of (e.g., internal and/or peripheral) geometry of blast-tube exit cavity 202. Use of polyurethane foam 142 facilitates destruction of plug 100 upon discharge of projectile through gun-blast diffuser 200.

Referring generally to FIG. 6 and particularly to, e.g., FIG. 1 for illustrative purposes only and not by way of limitation, the following portion of this paragraph delineates example 31 of the subject matter, disclosed herein. According to example 31, which encompasses example 30, above, the step of (block 1006) coupling substrate 104 to body 102 comprises a step of (block 1010) co-bonding substrate 104 and body 102.

Co-bonding substrate 104 and body 102 to each other reduces cycle time during fabrication of plug 100. Co-bonding substrate 104 and body 102 to each other also improves a bond between substrate 104 and body 102. Co-bonding substrate 104 and body 102 to each other also reduces downstream processing of plug 100.

Referring generally to FIG. 6 and particularly to, e.g., FIG. 1 for illustrative purposes only and not by way of limitation, the following portion of this paragraph delineates example 32 of the subject matter, disclosed herein. According to example 32, which encompasses example 30, above, the step of (block 1010) coupling substrate 104 to body 102 comprises a step of (block 1012) secondarily bonding substrate 104 to body 102.

Secondary bonding substrate 104 to body 102 facilitates automation and mass production of substrate 104 and body 102.

Figure 7:
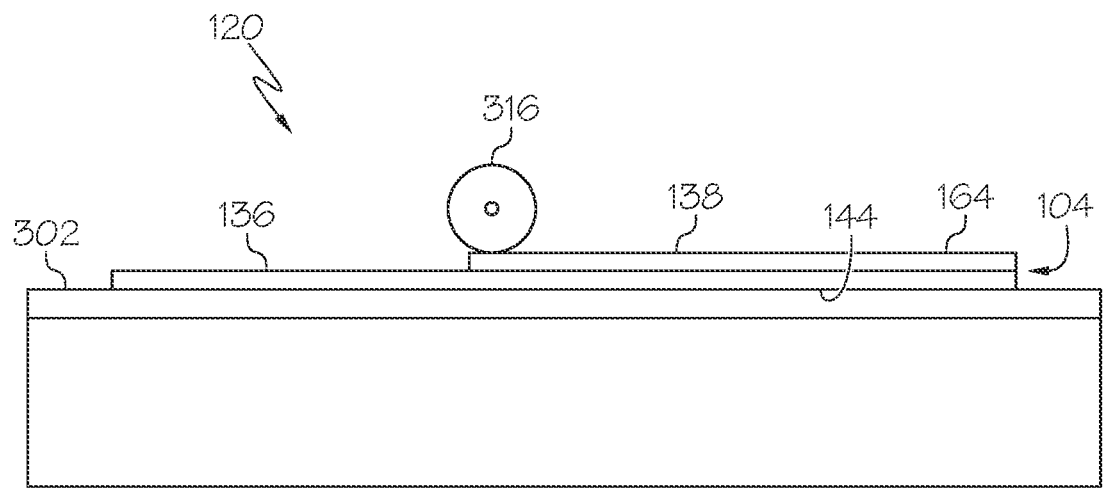
FIG. 7 is a schematic illustration of a preparation surface, used to impregnate a conductive nonwoven fabric with a polyurethane matrix to form a substrate of the plug of FIG. 1, according to one or more examples of the subject matter, disclosed herein.

Referring generally to FIG. 6 and particularly to, e.g., FIGS. 1 and 7 for illustrative purposes only and not by way of limitation, the following portion of this paragraph delineates example 33 of the subject matter, disclosed herein. According to example 33, which encompasses any one of examples 30 to 32, above, the step of (block 1002) impregnating conductive nonwoven fabric 136 with polyurethane matrix 138 to form substrate 104 comprises a step of (block 1014) placing conductive nonwoven fabric 136 on preparation surface 302, and a step of (block 1016) coating conductive nonwoven fabric 136 with polyurethane matrix 138 so that conductive nonwoven fabric 136 is embedded within polyurethane matrix 138.

Embedding conductive nonwoven fabric 136 within polyurethane matrix 138 provides the resin-rich zone on at least one side of conductive nonwoven fabric 136. The resin-rich zone, formed on at least one side of conductive nonwoven fabric 136, facilitates application and coupling (e.g., bonding) of substrate 104 to body 102.

In one or more examples, conductive nonwoven fabric 136 is impregnated with polyurethane matrix 138 in any one of various suitable techniques. In one or more examples, polyurethane matrix 138 is applied to conductive nonwoven fabric 136 using roller 316 (e.g., as shown in FIG. 7). Impregnating conductive nonwoven fabric 138 within polyurethane matrix 138 provides substrate 104 that is sufficiently sturdy and durable for handling and application onto body 102. In one or more examples, step of (block 1016) coating conductive nonwoven fabric 136 with polyurethane matrix 138 includes a step of applying one or more layers of polyurethane matrix 138 to conductive nonwoven fabric 136.

In one or more examples, method 1000 also includes a step of applying nickel coating 140 to conductive nonwoven fabric 136. In one or more examples, the step of applying nickel coating 140 to conductive nonwoven fabric 136 is performed using any one of various suitable techniques.

Referring generally to FIG. 6 and particularly to, e.g., FIGS. 1 and 7 for illustrative purposes only and not by way of limitation, the following portion of this paragraph delineates example 34 of the subject matter, disclosed herein. According to example 34, which encompasses example 33, above, preparation surface 302 has a surface roughness. Method 1000 further comprises a step of (block 1018) imparting a surface texture to substrate-side 144 of substrate 104 via preparation surface 302.

The surface texture of substrate 104 facilitates the bonding of substrate 104 to body 102.

Figure 8:
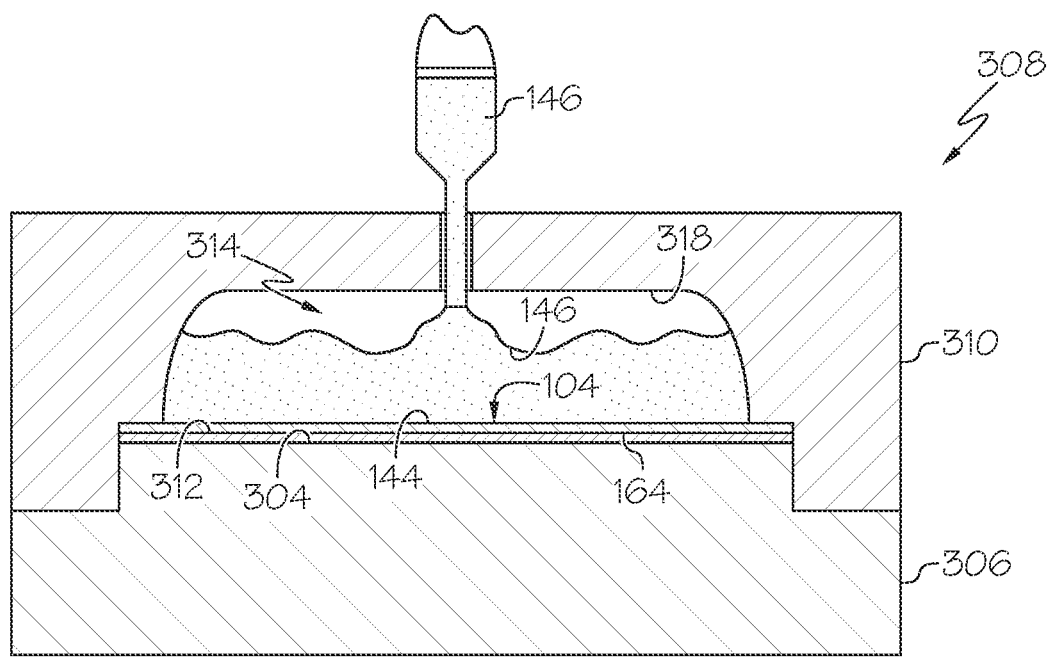
FIG. 8 is a schematic, sectional view of a mold, used to couple the substrate to a body of the plug of FIG. 1, according to one or more examples of the subject matter, disclosed herein.

In one or more examples, substrate-side 144 of substrate 104 on which the surface texture is imparted to, or is formed, is an inner surface of substrate 104 that is configured to contact and be bonded to body 102 (e.g., as shown in FIG. 8). The surface texture of substrate 104 provides some surface roughness to substrate-side 144 such that substrate-side 144 has an increased surface area for contact with and bonding to body 102, such as when co-bonding substrate 104 and body 102 to each other. Second substrate-side 164 of substrate 104, opposite substrate-side 144, is an outer surface of substrate 104 and forms the outer mold line of plug 100. In one or more examples, second substrate-side 164 of substrate 104 is substantially smooth.

In one or more examples, preparation surface 302 (e.g., as shown in FIG. 7) is porous (e.g., has a porosity). Due to the porosity of preparation surface 302, preparation surface 302 is configured to receive a portion of polyurethane matrix 138 that bleeds through conductive nonwoven fabric 136 when impregnating (e.g., coating) conductive nonwoven fabric 136 with polyurethane matrix 138. Thus, the porosity of preparation surface 302 forms the surface roughness of preparation surface 302 after curing (e.g., drying) of polyurethane matrix 138.

In one or more examples, preparation surface 302 includes, or takes the form of, a sheet material that is placed on a work surface (e.g., preparation table). In one or more examples, preparation surface 302 includes, or takes the form of, a release film that is configured to facilitate release and removal of substrate 104 from preparation surface 302 after coating conductive nonwoven fabric 136 with polyurethane matrix 138 and curing of polyurethane matrix 138. In one or more examples, preparation surface 302 is a polytetrafluoroethylene (PTFE) (e.g., Teflon®) coated sheet material. In one or more examples, preparation surface 302 is a sheet of polytetrafluoroethylene (PTFE) (e.g., Teflon®) material. In one or more examples, preparation surface 302 is a porous polytetrafluoroethylene (PTFE) coated glass fabric.

In one or more examples, preparation surface 302 is non-porous (e.g., has no porosity). In these examples, the surface roughness is formed on preparation surface 302 by any one of various other suitable techniques. In one or more examples, preparation surface 302 is substantially smooth (e.g., does not have a perceptible surface roughness). In these examples, the surface texture can be imparted to substrate-side 144 of substrate 104 by any one of various other suitable techniques.

Referring generally to FIG. 6 and particularly to, e.g., FIGS. 1 and 8 for illustrative purposes only and not by way of limitation, the following portion of this paragraph delineates example 35 of the subject matter, disclosed herein. According to example 35, which encompasses any one of examples 30, 31, 33, and 34, above, the step of (block 1006) coupling substrate 104 to body 102 comprises a step of (block 1020) positioning substrate 104 on outer mold-line surface 304 of first mold portion 306 of mold 308, a step of (block 1022) coupling first mold portion 306 of mold 308 to second mold portion 310 of mold 308 to form cavity 314 inside mold 308, a step of (block 1024) injecting polyurethane foam resin 146 into cavity 314 of mold 308, and a step of (block 1026) curing polyurethane foam resin 146 to co-bond substrate 104 to body 102.

Co-bonding substrate 104 and body 102 to each other as polyurethane foam resin 146 cures to form polyurethane foam 142 improves the bond between substrate 104 and body 102. Co-bonding substrate 104 and body 102 to each other as polyurethane foam resin 146 cures to form polyurethane foam 142 facilitates a single manufacturing step for forming plug 100 (e.g., block 1008) that integrates a step of forming body 102 and coupling substrate 104 and body 102 together.

In one or more examples, the step of (block 1010) co-bonding substrate 104 to body 102 comprises the step of (block 1020) positioning substrate 104 on outer mold-line surface 304 of first mold portion 306 of mold 308, the step of (block 1022) coupling first mold portion 306 of mold 308 to second mold portion 310 of mold 308 to form cavity 314 inside mold 308, the step of (block 1024) injecting polyurethane foam resin 146 into cavity 314 of mold 308, and the step of (block 1026) curing polyurethane foam resin 146 to co-bond substrate 104 to body 102

In one or more examples, the step of co-bonding substrate 104 to body 102 eliminates a need to adhesively bond substrate 104 to body 102 using a post-processing step after fabrication of substrate 104 and body 102. This integrated approach reduces manufacturing cycle time per plug 100.

In one or more examples, outer mold-line surface 304 (e.g., as shown in FIG. 8) of first mold portion 306 of mold 308 has dimensions, a geometry, and a shape that correspond to dimensions, a geometry, and a shape of blast-tube exit cavity 202. Accordingly, outer mold-line surface 304 of first mold portion 306 of mold 308 forms the outer mold line of plug 100 and forms a shape of plug front surface 112 of plug 100 such that plug front surface 112 of plug 100 is contiguous with exterior surface 218 of gun-blast diffuser 200. In one or more examples, outer mold-line surface 304 of first mold portion 306 and, thus, plug front surface 112 of plug 100 is substantially, or approximately, planar (e.g., flat). In one or more examples, outer mold-line surface 304 of first mold portion 306 and, thus, plug front surface 112 of plug 100 is concave. In one or more examples, outer mold-line surface 304 of first mold portion 306 and, thus, plug front surface 112 of plug 100 is convex.

In one or more examples, outer mold-line surface 304 (e.g., as shown in FIG. 8) of first mold portion 306 of mold 308 is larger than the outer mold line of plug 100 (e.g., is larger than plug front surface 112 of plug 100). In these examples, after the step of (block 1026) curing polyurethane foam resin 146 to co-bond substrate 104 to body 102, excess portions of substrate 104 (e.g., extending from body 102) are trimmed.

In one or more examples, inner mold line surface 318 of second mold portion 310 of mold 308 has a shape that corresponds to an inner mold line of plug 100 and forms a shape of plug side surface 116 and plug rear surface 114 of plug 100. Thus, cavity 314 of mold 308, formed by first mold portion 306 and second mold portion 310 has a shape that corresponds to plug 100. In one or more examples, inner mold line surface 318 of second mold portion 310 of mold 308 includes at least one recess, cavity, or other opening that corresponds to and forms plug protrusion 106 that extends from plug side surface 116 of plug 100.

In one or more examples, the step of (block 1020) positioning substrate 104 on outer mold-line surface 304 of first mold portion 306 of mold 308 includes a step of placing substrate 104 on outer mold-line surface 304 of first mold portion 306. In one or more examples, substrate 104 is positioned on outer mold-line surface 304 of first mold portion 306 such that substrate 104 is flat and free of wrinkles. In one or more examples, the step of (block 1020) positioning substrate 104 on outer mold-line surface 304 of first mold portion 306 includes a step of smoothing substrate 104 on outer mold-line surface 304 of first mold portion 306. In one or more examples, the step of (block 1020) positioning substrate 104 on outer mold-line surface 304 of first mold portion 306 of mold 308 also includes a step of temporarily securing substrate 104 to outer mold-line surface 304 of first mold portion 306, such as via adhesive tape.

In one or more examples, substrate 104 is formed having dimensions that are larger than required for formation of plug 100. In these examples, substrate 104 is cut or otherwise trimmed to a shape suitable for positioning on outer mold-line surface 304 of first mold portion 306. In one or more examples, a cut-template is used to form the shape of substrate 104. The cut-template has dimensions and a shape that respectively correspond to dimensions and a shape of outer mold-line surface 304 of first mold portion 306.

In one or more examples, the step of (block 1022) coupling first mold portion 306 of mold 308 to second mold portion 310 of mold 308 to form cavity 314 inside mold 308 includes a step of closing mold 308 and temporarily securing first mold portion 306 and mold 308 to second mold portion 310 together.

In one or more examples, polyurethane foam resin 146 is a precursor (e.g., flowable and uncured) form of polyurethane foam 142 that is capable of being injected into cavity 314 of mold 308. In one or more examples, polyurethane foam resin 146 is Stepan Foam AC-555 resin, commercially available from Stepan Company of Illinois, USA. In one or more examples, second mold portion 310 includes at least one injection port formed through second mold portion and in volumetric communication with cavity 314 when first mold portion 306 and mold 308 and second mold portion 310 are coupled to each other to form mold 308. Polyurethane foam resin 146 is injected into cavity 314 via the injection port.

In one or more examples, second mold portion 310 also includes at least one venting port, formed through second mold portion and in volumetric communication with cavity 314 when first mold portion 306, mold 308, and second mold portion 310 are coupled to each other, forming mold 308. During injection and/or cure of polyurethane foam resin 146, air, release gasses, and expanded portions of polyurethane foam resin 146 escape cavity 314 via the venting port to prevent formation of voids in plug 100.

In one or more examples, the step of (block 1026) curing polyurethane foam resin 146 includes hardening polyurethane foam resin 146 into polyurethane foam 142, resulting in forming body 102. The step of (block 1026) curing polyurethane foam resin 146 also results in concurrent co-bonding of substrate 104 to body 102 as polyurethane foam resin 146 cures.

Referring generally to FIG. 6 and particularly to, e.g., FIGS. 1 and 8 for illustrative purposes only and not by way of limitation, the following portion of this paragraph delineates example 36 of the subject matter, disclosed herein. According to example 36, which encompasses example 35, above, method 1000 further comprises a step of (block 1028) positioning release film 312 between substrate 104 and outer mold-line surface 304 of first mold portion 306 of mold 308.

Use of release film 312 enables release of plug front surface 112 from first mold portion 306 and removal of first mold portion 306 from plug 100 after cure.

In one or more examples, release film 312 is a polytetrafluoroethylene (PTFE) (e.g., Teflon®) coated sheet material. In one or more examples, release film 312 is a sheet of polytetrafluoroethylene (PTFE) (e.g., Teflon®) material. In one or more examples, release film 312 is a non-porous fluorinated ethylene propylene (FEP) coated glass fabric.

In one or more examples, method 1000 includes a step of applying a release agent to inner mold line surface 318 of second mold portion 310 of mold 308. Use of the release agent enables release of plug rear surface 114 and plug side surface 116 from second mold portion 310 and removal of plug 100 from second mold portion 310 from after cure.

Referring generally to FIG. 6 and particularly to, e.g., FIGS. 1 and 8 for illustrative purposes only and not by way of limitation, the following portion of this paragraph delineates example 37 of the subject matter, disclosed herein. According to example 37, which encompasses example 35 or 36, above, second mold portion 310 is more flexible than first mold portion 306. Method 1000 further comprises a step of (block 1030) separating first mold portion 306 from second mold portion 310 after curing polyurethane foam resin 146, and a step of (block 1032) removing plug 100 from second mold portion 310.

First mold portion 306 being more rigid than second mold portion 310 prevents substrate 104 from wrinkling during injection and cure of polyurethane foam resin 146. Because body 102 of plug 100 is frangible, second mold portion 310 being more flexible than first mold portion 306 enables removal of plug 100 from second mold portion 310 without damaging body 102.

In one or more examples, first mold portion 306 is rigid. In one or more examples, first mold portion 306 is made of a plastic or metallic material. In one or more examples, second mold portion 310 is flexible. In one or more examples, second mold portion 310 is made of a rubber or silicone material.

In one or more examples, any excess portions of polyurethane foam 142 of body 102 (e.g., resulting from bleed out of polyurethane foam resin 146 during injection and cure) are trimmed and plug 100 is otherwise shaped to fit within blast-tube exit cavity 202.

Referring generally to FIG. 6 and particularly to, e.g., FIGS. 1 and 7 for illustrative purposes only and not by way of limitation, the following portion of this paragraph delineates example 38 of the subject matter, disclosed herein. According to example 38, which encompasses any one of examples 35 to 37, above, method 1000 further comprises a step of (block 1034) detecting a presence of an opening in substrate 104 before positioning substrate 104 on outer mold-line surface 304 of first mold portion 306 of mold 308, and a step of (block 1036) recoating conductive nonwoven fabric 136 with polyurethane matrix 138 to fill the opening.

Filling and, thus, eliminating any openings that extend through substrate 104 prevent polyurethane foam resin 146 from bleeding through substrate 104.

Openings, such as pinholes, in substrate 104 are undesirable. In one or more examples, openings in substrate 104 can enable polyurethane foam resin 146 to pass through substrate 104 during the co-bonding operation, which is undesirable. In one or more examples, openings in substrate 104 can enable adhesive to pass through substrate 104 during the secondary bonding operation, which is also undesirable. Thus, eliminating such opening is beneficial for production of plug 100. Embedding conductive nonwoven fabric 136 within polyurethane matrix 138 to form the resin-rich zone on at least substrate-side 144 of substrate 104 (e.g., the side that contacts and that is bonded to polyurethane foam 142 of body 102) reduces the chances of openings being present in substrate 104.

In one or more examples, the step of (block 1034) detecting the presence of the opening in substrate 104 is performed using any one of various suitable techniques, such as visual inspection, machine vision inspection, and the like. In one or more examples, when openings are detected, the step of (block 1036) recoating conductive nonwoven fabric 136 with polyurethane matrix 138 to fill the opening includes a step of reapplying one or more layers of polyurethane matrix 138 to conductive nonwoven fabric 136.

In one or more examples, method 1000 is also used for making second plug 120 and/or third plug 148. In one or more examples, at least a portion of the operational steps of method 1000 are used to make second plug 120 is substantially the same manner as that described for making plug 100. In one or more examples, at least a portion of the operational steps of method 1000 are used to make third plug 148 is substantially the same manner as that described for making plug 100.

Accordingly, plug 100, gun-blast diffuser 200, and method 1000, disclosed herein provide a means to reduce the radar cross section of aircraft 1200 by eliminating the relatively large cavities (e.g., blast-tube exit cavity 202, second-blast-tube exit cavity 208 (e.g., when present), and third-blast-tube exit cavity 214 (e.g., when present) in gun-blast diffuser 200 by filling (e.g., plugging) the cavities with a plug (e.g., plug 100, second plug 120 (e.g., when present) and third plug 148 (e.g., when present) and preventing radar signals from entering and bouncing around inside the cavities. The plug has a conductive front surface and fits in a corresponding cavity such that radar energy cannot penetrate the cavity behind the plug. The reduction in the radar cross section is achieved by selecting a conductive material (e.g., conductive nonwoven fabric 136) to form an outer mold line of the plug. A brittle and frangible material is selected to form a body of the plug such that the plug can withstand flight wetted surface pressures without cracking and can be destroyed when impacted by a bullet or high-pressure gas, travelling through gun-blast diffuser 200. The conductivity of the outer mold line of the plug is below a minimum conductivity for microwaves to pass over, such as less than 2 $\Omega$/sq, such as less than 1 $\Omega$/sq.

Figure 9:
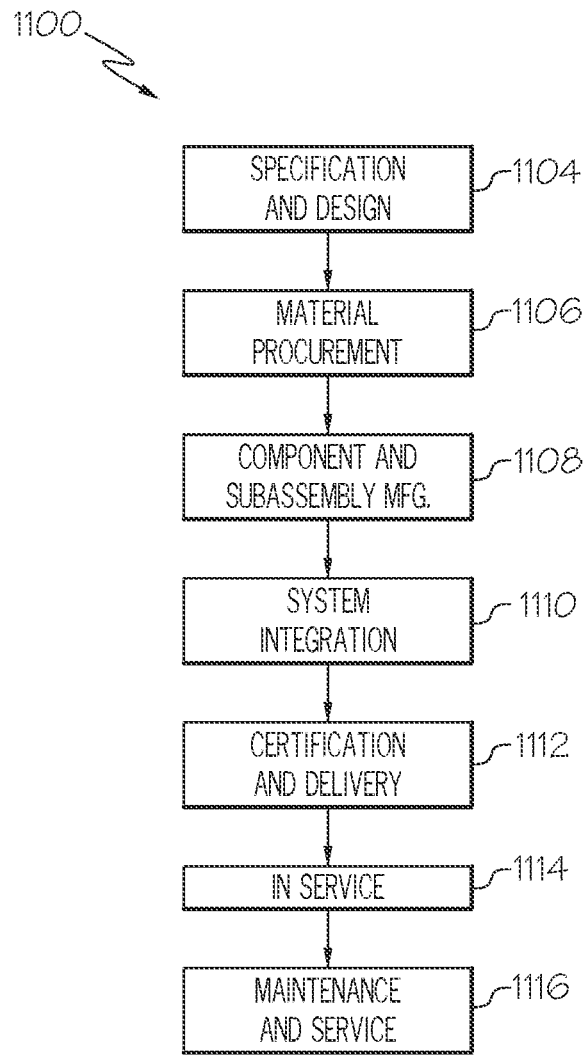
FIG. 9 is a block diagram of aircraft production and service methodology.
Figure 10:
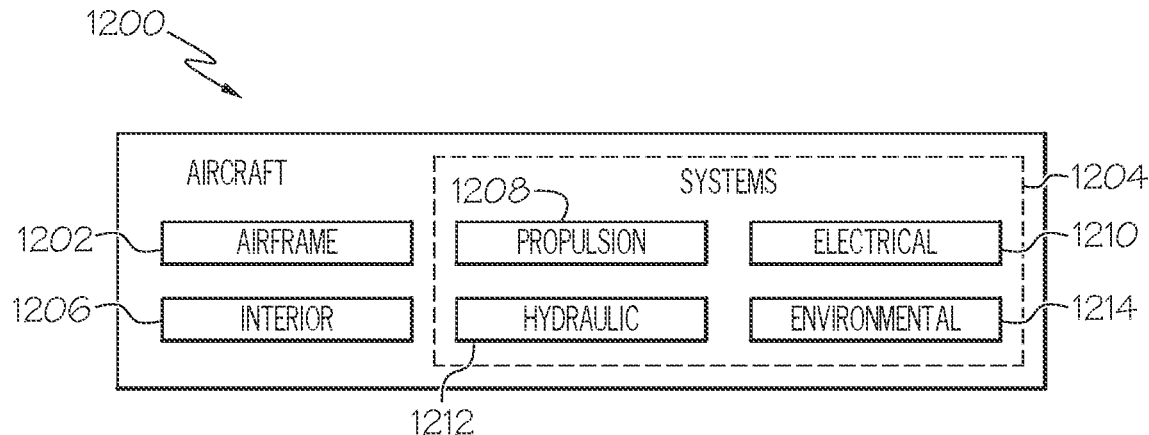
FIG. 10 is a schematic block diagram of the aircraft.

Examples of the subject matter, disclosed herein may be described in the context of aircraft manufacturing and service method 1100 as shown in FIG. 9 and aircraft 1200 as shown in FIG. 10. During pre-production, illustrative method 1100 may include specification and design (block 1104) of aircraft 1200 and material procurement (block 1106). During production, component and subassembly manufacturing (block 1108) and system integration (block 1110) of aircraft 1200 may take place. Thereafter, aircraft 1200 may go through certification and delivery (block 1112) to be placed in service (block 1114). While in service, aircraft 1200 may be scheduled for routine maintenance and service (block 1116). Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212, and environmental system 1214. Any number of other systems may be included. Although an aerospace example is shown, the principles disclosed herein may be applied to other industries, such as the automotive industry. Accordingly, in addition to aircraft 1200, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1200 is in service (block 1114). Also, one or more examples of the apparatus(es), method(s), or combination thereof may be utilized during production stages (block 1108 and block 1110), for example, by substantially expediting assembly of or reducing the cost of aircraft 1200. Similarly, one or more examples of the apparatus or method realizations, or a combination thereof, may be utilized, for example and without limitation, while aircraft 1200 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A plug for insertion into a blast-tube exit cavity of a gun-blast diffuser, the plug comprising:
   a plug front surface;
   a plug rear surface;
   a plug side surface that extends between the plug front surface and the plug rear surface;
   a body, comprising a polyurethane foam; and
   a substrate, coupled to the body and comprising a conductive nonwoven fabric, impregnated with a polyurethane matrix,
   wherein:
      the plug front surface is formed by the substrate and has a front-surface area;
      the plug rear surface is formed by the body;
      the plug side surface is formed by the substrate and the body and has a side-surface area;
      a ratio of the front-surface area to the side-surface area is from 1.4:1 to 2.6:1; and
      the polyurethane foam has a density of approximately 84.9 kilograms per cubic meter and a compressive strength from approximately 68,947 pascals to 496,423 pascals.

2. The plug according to claim 1, wherein the substrate has an electrical conductivity of less than 2 ohms per square unit of area.

3. The plug according to claim 1, wherein the conductive nonwoven fabric comprises carbon fibers.

4. The plug according to claim 1, wherein the substrate further comprises a nickel coating, applied to the conductive nonwoven fabric.

5. The plug according to claim 1, wherein the conductive nonwoven fabric is embedded within the polyurethane matrix.

6. The plug according to claim 1, wherein the polyurethane foam is a closed-cell foam.

7. The plug according to claim 1, having a thickness from 0.012 meter to 0.031 meter.

8. The plug according to claim 1, further comprising a plug protrusion, extending from a portion of the plug side surface of the plug to facilitate an interference fit between the plug and the gun-blast diffuser,
   wherein the plug protrusion comprises a front end located proximate the plug front-surface and a rear end located proximate the plug rear-surface.

9. The plug according to claim 1, wherein:
   the substrate comprises a substrate-side and a second substrate-side, opposite the substrate-side;
   the substrate-side comprises a surface texture formed when the conductive nonwoven fabric is impregnated with the polyurethane matrix;
   the second substrate side is smooth;
   the substrate-side is coupled to the body; and
   the plug front surface is formed by the second substrate-side of the substrate.

10. A gun-blast diffuser for an aircraft, the gun-blast diffuser comprising:
    a blast tube, comprising a blast-tube exit cavity;
    a plug, comprising:
       a plug front surface;
       a plug rear surface;
       a plug side surface that extends between the plug front surface and the plug rear surface;
       a body, comprising a polyurethane foam; and
       a substrate, coupled to the body and comprising a conductive nonwoven fabric, impregnated with a polyurethane matrix,
    wherein:
       at least a portion of the plug is located within the blast-tube exit cavity;
       the plug front surface is defined by the substrate and has a front-surface area;
       the plug rear surface is defined by the body; and
       the plug side surface is defined by the substrate and the body and has a side-surface area;
       a ratio of the front-surface area to the side-surface area is from 1.4:1 to 2.6:1; and
       the polyurethane foam has a density of approximately 84.9 kilograms per cubic meter and a compressive strength from approximately 68,947 pascals to 496,423 pascals.

11. The gun-blast diffuser according to claim 10, further comprising a sealant, located between at least the portion of the plug side surface and at least the portion of the blast tube.

12. A method of making a plug for insertion into a blast-tube exit cavity of a gun-blast diffuser, the plug comprising a plug front surface, a plug rear surface, and a plug side surface that extends between the plug front surface and the plug rear surface, the method comprising steps of:
    impregnating a conductive nonwoven fabric with a polyurethane matrix to form a substrate; and
    coupling the substrate to a body, comprising a polyurethane foam, so that:
       the plug front surface is formed by the substrate and has a front-surface area;
       the plug rear surface is formed by the body;
       the plug side surface is formed by the substrate and the body and has a side surface area;
       a ratio of the front-surface area to the side-surface area is from 1.4:1 to 2.6:1; and
       the polyurethane foam has a density of approximately 84.9 kilograms per cubic meter and a compressive strength from approximately 68,947 pascals to 496,423 pascals.

13. The method according to claim 12, wherein the step of coupling the substrate to the body comprises co-bonding the substrate and the body.

14. The method according to claim 12, wherein the step of coupling the substrate to the body comprises secondarily bonding the substrate to the body.

15. The method according to claim 12, wherein the step of impregnating the conductive nonwoven fabric with the polyurethane matrix to form the substrate comprises:
    placing the conductive nonwoven fabric on a preparation surface; and
    coating the conductive nonwoven fabric with the polyurethane matrix so that the conductive nonwoven fabric is embedded within the polyurethane matrix.

16. The method according to claim 15, wherein:
    the preparation surface has a surface roughness; and
    the method further comprises imparting a surface texture to a substrate-side of the substrate via the preparation surface;
    the substrate-side of the substrate is coupled to the body; and
    the plug front surface is formed by a second substrate-side of the substrate that is smooth.

17. The method according to claim 12, wherein the step of coupling the substrate to the body comprises:
    positioning the substrate on an outer mold-line surface of a first mold portion of a mold;

coupling the first mold portion of the mold to a second mold portion of the mold to form a cavity inside the mold;
injecting a polyurethane foam resin into the cavity of the mold; and
curing the polyurethane foam resin to co-bond the substrate to the body.

18. The method according to claim 17, further comprising positioning a release film between the substrate and the outer mold-line surface of the first mold portion of the mold.

19. The method according to claim 17, wherein:
the second mold portion is more flexible than the first mold portion; and
the method further comprises:
separating the first mold portion from the second mold portion after curing the polyurethane foam resin; and
removing the plug from the second mold portion.

20. The method according to claim 17, further comprising:
detecting a presence of an opening in the substrate before positioning the substrate on the outer mold-line surface of the first mold portion of the mold; and
recoating the conductive nonwoven fabric with the polyurethane matrix to fill the opening.

* * * * *